United States Patent
Hineno et al.

(10) Patent No.: US 9,091,882 B2
(45) Date of Patent: Jul. 28, 2015

(54) LIGHT EMITTING MODULE, SURFACE LIGHT SOURCE, LIQUID CRYSTAL DISPLAY, AND ILLUMINATING DEVICE

(75) Inventors: Mitsuru Hineno, Osaka (JP); Masaki Tatsumi, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 627 days.

(21) Appl. No.: 13/508,868

(22) PCT Filed: Nov. 12, 2010

(86) PCT No.: PCT/JP2010/070170
§ 371 (c)(1),
(2), (4) Date: May 9, 2012

(87) PCT Pub. No.: WO2011/065238
PCT Pub. Date: Jun. 3, 2011

(65) Prior Publication Data
US 2012/0320309 A1    Dec. 20, 2012

(30) Foreign Application Priority Data
Nov. 30, 2009   (JP) .................................. 2009-272277

(51) Int. Cl.
*F21V 9/00*    (2015.01)
*G02F 1/1335*  (2006.01)

(52) U.S. Cl.
CPC .... *G02F 1/133603* (2013.01); *G02F 1/133609* (2013.01)

(58) Field of Classification Search
CPC ..................... G02F 1/133603; G02F 1/134309
USPC ..................... 349/64; 362/231, 268, 308, 328
See application file for complete search history.

(56) References Cited

U.S. PATENT DOCUMENTS

| 7,973,881 | B2 | 7/2011 | Ochiai |
| 2009/0122230 | A1 | 5/2009 | Ochiai |
| 2010/0008071 | A1 | 1/2010 | Kim et al. |

FOREIGN PATENT DOCUMENTS

| CN | 1858635 A | 11/2006 |
| JP | 2007-80530 | 3/2007 |
| JP | 2008-153039 | 7/2008 |
| JP | 2009-123489 | 6/2009 |
| TW | 201003246 A1 | 1/2010 |
| WO | WO 2009/017007 | 2/2009 |

OTHER PUBLICATIONS

International Search Report for PCT/JP2010/070170 mailed Feb. 15, 2011.

*Primary Examiner* — Andrew Coughlin
(74) *Attorney, Agent, or Firm* — Nixon & Vanderhye, P.C.

(57) ABSTRACT

The purpose of the present invention is providing a light emitting module capable of emitting illumination light having a nearly uniform color tone as a whole. The invention also provides a surface light source having such light emitting modules, and a liquid crystal display and an illuminating device having such a surface light source.
In a light emitting module (50), adjacent dot light sources (17, 17) satisfy the relationships $\Delta X1+\Delta X2=\Delta X\times 2$ and $\Delta Y1+\Delta Y2=\Delta Y\times 2$, so that the resultant mixed color can fall within a target chromaticity rank area (M), and the center (gc) of a first chromaticity rank area g and the center (Ec) of a second chromaticity rank area (E) are axisymmetric with respect to virtual straight lines (gE1, gE2) that pass through the center (Mc) of the target chromaticity rank area (M) and parallel to one side or another side of the target chromaticity rank area (M).

25 Claims, 25 Drawing Sheets

FIG.8
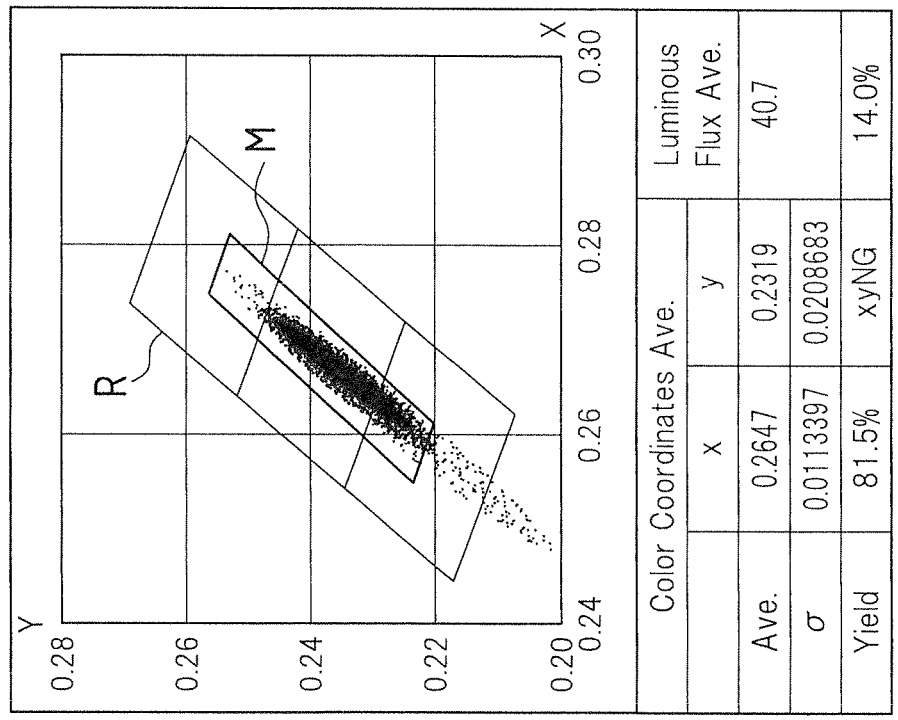
(a)
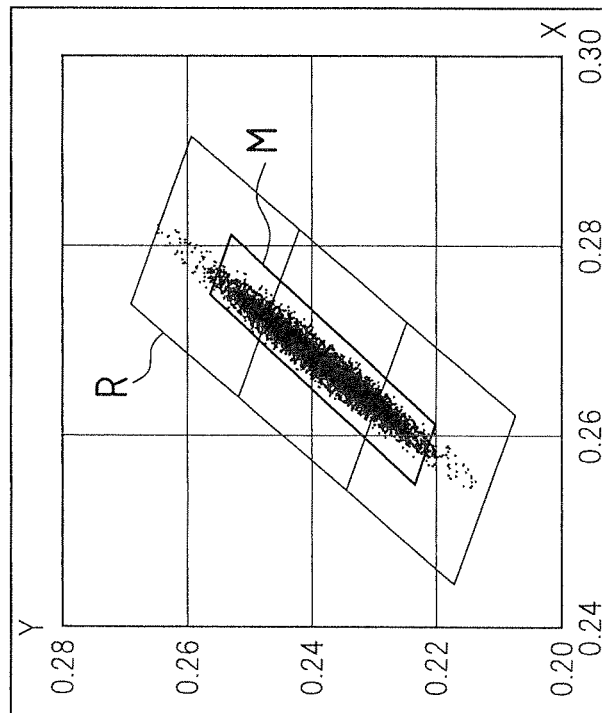
(b)

FIG.9
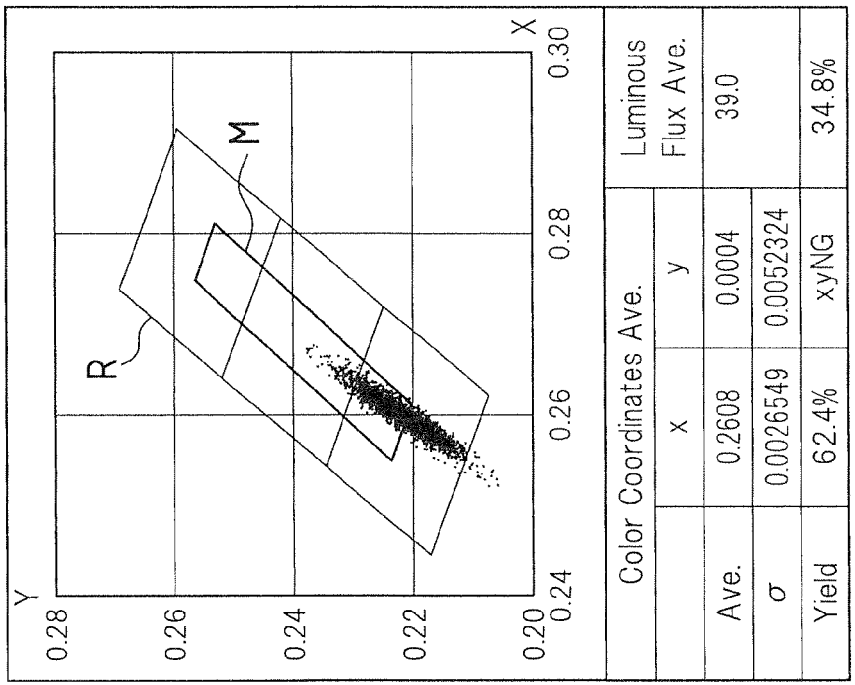
(a)
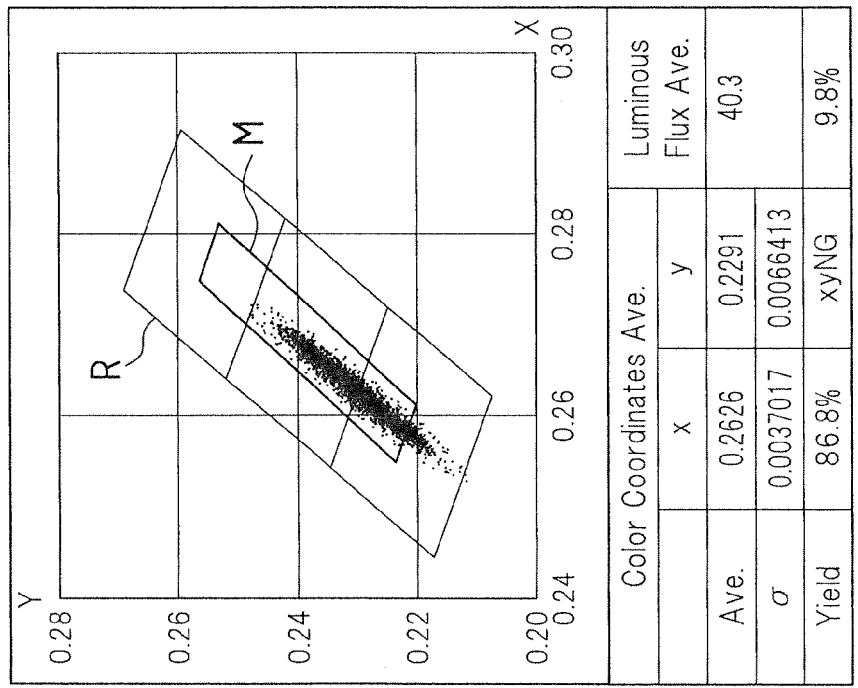
(b)

LIGHT EMITTING MODULE, SURFACE LIGHT SOURCE, LIQUID CRYSTAL DISPLAY, AND ILLUMINATING DEVICE

This application is the U.S. national phase of International Application No. PCT/JP2010/070170 filed 12 Nov. 2010 which designated the U.S. and claims priority to JP 2009-272277 filed 30 Nov. 2009, the entire contents of each of which are hereby incorporated by reference.

TECHNICAL FIELD

The present invention relates to a light emitting module, a surface light source, a liquid crystal display, and an illuminating device.

BACKGROUND ART

A liquid crystal panel used for a liquid crystal display such as a liquid crystal TV receiver, for example, does not emit light spontaneously and thus needs a backlight device separately as an illuminating device. As the backlight device, one placed on the back side of the liquid crystal panel (side opposite to its display surface) is well known, which has a number of dot light sources (e.g., light emitting elements such as light emitting diodes).

A backlight device using white light emitting diodes (white LEDs) is known. However, white LEDs often have variations in the tone of white color. Under such circumstances, a backlight device described in Patent Document 1 is known as a device capable of emitting a predetermined level of white light using white LEDs having variations in color tone. In this backlight device, when the light from the white LEDs has a tinge of yellow, light emission of blue LEDs is intensified, to obtain a predetermined level of white light. Patent Document 2 to be described later also describes a similar technique.

PRIOR ART DOCUMENTS

Patent Documents

[Patent Document 1] JP 2008-153039A
[Patent Document 2] JP2007-080530A

SUMMARY OF INVENTION

Problems to be Solved by the Invention

The backlight device disclosed in Patent Document 1 has the following problems. Since the backlight device uses two kinds of LEDs different in the tone of white color, the management is complicated, and, if the white LEDs have a tinge of green, it is not possible to obtain a predetermined level of white light. To obtain a predetermined level of white light, only white LEDs emitting the predetermined level of white light may be selected and used. In this case, however, because of the use of only the limited white LEDs, a larger number of white LEDs than is necessary have to be produced. This may lead to increase in the cost of the backlight device.

Patent Document 2 describes an example of placement of a plurality of light emitting diodes having a predetermined chromaticity distribution on a printed board, in which the light emitting diodes are placed so that the mixed color between the adjacent light emitting diodes can fall within a target chromaticity range. However, Patent Document 2 little defines the details on the sizes of chromaticity ranges to which the light emitting diodes belong, the positional relationships between these chromaticity ranges and the target chromaticity range, etc., failing to clarify the details of the disclosure.

In view of the circumstances described above, it is an object of the present invention to provide, at low cost, a light emitting module free from chromaticity variations as a surface light source itself, or a part thereof, for a liquid crystal display and an illuminating device. It is also an object of the present invention to provide a surface light source having such a light emitting module, and a liquid crystal display and an illuminating device having such a surface light source.

Means for Solving the Problems

The present invention has been completed based on the findings that, in a light emitting module having a plurality of dot light sources emitting white light placed on a substrate, illumination light having a nearly uniform color tone as a whole can be obtained by arranging the plurality of dot light sources on the substrate so that the mixed color of light from the adjacent dot light sources can fall within a target chromaticity rank area.

Specifically, the present invention provides a light emitting module including: a substrate; and a plurality of dot light sources placed on the substrate and configured to emit white light, wherein each of the dot light sources is classified into a chromaticity rank on CIE 1931 coordinates according to its chromaticity, one dot light source, out of adjacent dot light sources, belongs to a parallelogram-shaped first chromaticity rank area, and the other dot light source belongs to a parallelogram-shaped second chromaticity rank area, one side, or another side not in parallel with the one side, of each of the first and second chromaticity rank areas is parallel to one side, or another side not in parallel with the one side, of a parallelogram-shaped target chromaticity rank area, assuming that an x-coordinate difference that is a chromaticity coordinate difference of the one side of the target chromaticity rank area projected on the x-axis is $\Delta X$, the one side being the side that can be directly projected on the x-axis, and a y-coordinate difference that is a chromaticity coordinate difference of the another side of the target chromaticity rank area projected on the y-axis is $\Delta Y$, the another side being the side that can be directly projected on the y-axis, that an x-coordinate difference that is a chromaticity coordinate difference of the one side of the first chromaticity rank area projected on the x-axis is $\Delta X1$, the one side being the side that can be directly projected on the x-axis, and a y-coordinate difference that is a chromaticity coordinate difference of the another side of the first chromaticity rank area projected on the y-axis is $\Delta Y1$, the another side being the side that can be directly projected on the y-axis, and that an x-coordinate difference that is a chromaticity coordinate difference of the one side of the second chromaticity rank area projected on the x-axis is $\Delta X2$, the one side being the side that can be directly projected on the x-axis, and a y-coordinate difference that is a chromaticity coordinate difference of the another side of the second chromaticity rank area projected on the y-axis is $\Delta Y2$, the another side being the side that can be directly projected on the y-axis, the adjacent dot light sources satisfy relationships $\Delta X1+\Delta X2=\Delta X\times 2$ and $\Delta Y1+\Delta Y2=\Delta Y\times 2$ so that the resultant mixed color can fall within the target chromaticity rank area, and the center of the first chromaticity rank area and the center of the second chromaticity rank area are axisymmetric with respect to a virtual straight line that passes through the center of the target chromaticity rank area and is parallel to the one side or the another side of the target chromaticity rank area.

It should be noted that the wording that one side of each of the chromaticity rank areas can be directly projected on the x-axis described above means that, in drawing lines vertical to the x-axis from both ends of the one side to the x-axis, the lines do not cross the chromaticity rank area. Likewise, the wording that another side of each of the chromaticity rank areas can be directly projected on the y-axis described above means that, in drawing lines vertical to the y-axis from both ends of the another side to the y-axis, the lines do not cross the chromaticity rank area. The one side and the another side forming an intersection point are selected so that the angle formed by these sides be 90° or less, and projected on the x-axis and y-axis.

The present invention also provides a surface light source including the light emitting modules of the present invention and a housing, the light emitting modules each having the plurality of dot light sources arranged in line on the substrate being placed in a matrix on the housing.

According to the light emitting module and the surface light source of the present invention, the adjacent dot light sources satisfy the relationships $\Delta X1+\Delta X2=\Delta X\times 2$ and $\Delta Y1+\Delta Y2=\Delta Y\times 2$ so that the resultant mixed color can fall within the target chromaticity rank area, and the center of the first chromaticity rank area and the center of the second chromaticity rank area are axisymmetric with respect to a virtual straight line that passes through the center of the target chromaticity rank area and is parallel to the one side or the another side of the target chromaticity rank area. Therefore, in arranging the plurality of dot light sources on the substrate, the adjacent dot light sources can be placed so that the resultant mixed color of light can fall within the target chromaticity rank area, and thus illumination light having a nearly uniform color tone as a whole can be obtained.

According to the present invention, illustrative form (a) can be presented where the one dot light source belongs to a third chromaticity rank area that is included in the first chromaticity rank area and smaller in size than the first chromaticity rank area, and the other dot light source belongs to a fourth chromaticity rank area that is included in the second chromaticity rank area and smaller in size than the second chromaticity rank area.

In the form (a), a dot light source belonging to the third chromaticity rank area smaller in size than the first chromaticity rank area can be selected as the one dot light source, and a dot light source belonging to the fourth chromaticity rank area smaller in size than the second chromaticity rank area can be selected as the other dot light source.

According to the present invention, illustrative form (b) can be presented where the one and other dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas.

In the form (b), the chromaticity range (chromaticity area) after the color mixture of the adjacent dot light sources on the substrate can be reduced, permitting reduction in chromaticity unevenness in the plane of the light emitting module.

According to the present invention, illustrative form (c) can be presented where either one of the third and fourth chromaticity rank areas is placed at least within the target chromaticity rank area.

In the form (c), the chromaticity after the color mixture of the adjacent dot light sources can easily fall within the target chromaticity rank area, making it possible to prevent or reduce occurrence of chromaticity unevenness.

According to the present invention, illustrative form (d) can be presented where the third chromaticity rank area is apart from the fourth chromaticity rank area.

In the form (d), it is possible to reduce the dead stock of dot light sources deviated in chromaticity from the target chromaticity rank area.

According to the present invention, illustrative form (e) can be presented where the third chromaticity rank area is opposed to the fifth chromaticity rank area with the target chromaticity rank area interposed therebetween.

In the form (e), it is possible to further reduce the dead stock of dot light sources deviated in chromaticity from the target chromaticity rank area.

According to the present invention, illustrative form (f) can be presented where the third chromaticity rank area is the same in area as the fifth chromaticity rank area.

In the form (f), a dot light source belonging to the third chromaticity rank area and a dot light source belonging to the fifth chromaticity rank area are not largely different in color tone. Therefore, the chromaticity result after the color mixture of the adjacent dot light sources further falls within the target chromaticity rank area, making it possible to prevent or reduce occurrence of chromaticity unevenness.

According to the present invention, illustrative form (g) can be presented where the third and fourth chromaticity rank areas are quadrangular, and the third chromaticity rank area is placed adjacent to the fourth chromaticity rank area with its side in contact with one side of the fourth chromaticity rank area.

In the form (g), dot light sources belonging to chromaticity rank areas close to each other can be selected as the one dot light source and the other dot light source. This can be applied, when the distribution of chromaticity variations of mass-produced dot light sources is a standard one including no chromaticity variation distribution largely deviated from the target chromaticity area, to a placement method in which the stock of dot light sources can be used without being wasted and adjustment can be made to ensure that the resultant mixed color of adjacent dot light sources can fall within the target chromaticity area.

According to the present invention, illustrative form (h) can be presented where the fourth chromaticity rank area is within the target chromaticity rank area and does not overlap the sixth chromaticity rank area.

In the form (h), the chromaticity after the color mixture of the adjacent dot light sources can easily fall within the target chromaticity rank area, and also a dot light source belonging to the sixth chromaticity rank area different from the fourth chromaticity rank area can be selected.

According to the present invention, an illustrative embodiment can be presented where the chromaticity rank area actually used for the dot light sources is in a shape of a parallelogram of which one side and another side not in parallel with the one side are respectively parallel to the one side and the another side not in parallel with the one side of the target chromaticity rank area.

In the case described above, an illustrative embodiment can be presented where the third chromaticity rank area is in a shape of a trapezoid formed by cutting away part of the parallelogram from the standpoint of further reducing the size.

According to the present invention, preferably, the third and fourth chromaticity rank areas are smaller in size than the target chromaticity rank area.

Preferably, the target chromaticity rank area actually used for the dot light sources is set within a square chromaticity rank area having vertices at four chromaticity points (Xm+

0.01, Ym+0.01), (Xm−0.01, Ym−0.01), (Xm+0.01, Ym−0.01), and (Xm−0.01, Ym+0.01) defined with respect to the chromaticity point (Xm, Ym) of the center.

According to the present invention, the substrate can be long shaped, and the plurality of spot light sources can be placed linearly along the length of the substrate.

In the above embodiment, since the placement state of the dot light sources is determined uniquely depending on the placement state of the substrate, the layout design of the dot light sources can be facilitated.

According to the present invention, the plurality of spot light sources can be placed on the substrate at equal intervals.

In the above embodiment, the placement state of the dot light sources does not change with the substrate. Therefore, even if the light emitting module is changed in size, the substrate can also be used for the new light emitting module.

According to the present invention, preferably, the plurality of spot light sources have the same configuration.

In the above embodiment, since dot light sources of the same type can be used as the plurality of dot light sources, the cost of the dot light sources can be reduced.

According to the present invention, the dot light sources can be light emitting diodes. In this case, longer-life and lower-power light sources can be implemented.

The dot light sources can be light emitting diodes emitting white light, obtained by applying a phosphor having a light emission peak in the yellow region to blue light emitting chips.

Alternatively, the dot light sources can be light emitting diodes emitting white light, obtained by applying a phosphor having light emission peaks in the green and red regions to blue light emitting chips. Otherwise, the dot light sources can be light emitting diodes emitting white light, obtained by applying a phosphor having a light emission peak in the green region to blue light emitting chips and combining the resultant chips with red chips.

Alternatively, the dot light sources can be light emitting diodes emitting white light, obtained by combining blue, green, and red light emitting chips.

In use of such light emitting diodes emitting white light, the white color may have a tinge of blue, for example, easily causing variations in color tone. By applying the configuration of the present invention, the color tone can be averaged as a whole, permitting achievement of illumination light having a nearly uniform color tone.

Each of the dot light sources can be constituted by an ultraviolet light emitting chip and a phosphor. In particular, the dot light source may be constituted by an ultraviolet light emitting chip and a phosphor having light emission peaks in blue, green, and red regions.

In such light sources, also, variations in color tone tend to occur. However, by applying the configuration of the present invention, the color tone can be averaged as a whole, permitting achievement of illumination light having a nearly uniform color tone.

Diffusion lenses capable of diffusing light from the dot light sources may be attached to the substrate to cover the dot light sources. In this case, since light is diffused with the diffusion lenses, dot lamp images are not likely to occur even when the spacing between the adjacent dot light sources is increased. It is therefore possible to obtain a nearly uniform brightness distribution while achieving cost reduction by reducing the number of dot light sources placed. Also, with placement of such diffusion lenses, light rays from the dot light sources can be mixed, producing the effect of reducing the color unevenness. Thus, further chromaticity uniformity can be achieved.

The diffusion lenses can be made of a light diffusing member capable of diffusing light. In this case, good light diffusion can be attained with the diffusion lenses.

The diffusion lenses can be ones the surfaces of which facing the substrate are roughened. With such surface roughening, such as graining, performed on the diffusion lenses, further good light diffusion can be attained.

In the surface light source of the present invention, for the purpose of satisfactorily presenting illumination light having a nearly uniform color tone, it is preferable to place the first light emitting module of at least one embodiment, out of the forms (a) to (h) described above, and the second light emitting module of at least one embodiment, out of the forms (a) to (h), adjacent to each other in the direction orthogonal to the direction of arrangement of the dot light sources on the housing.

Also, in the surface light source of the present invention, for the purpose of satisfactorily presenting illumination light having a nearly uniform color tone, it is preferable that at least one of the light emitting modules adjacent in the direction orthogonal to the direction of arrangement of the dot light sources be the third light emitting module of at least one embodiment out of the forms (a) to (h).

In the surface light source of the present invention, it is preferable to use, as the light emitting module placed at the periphery of the housing, a light emitting module where a dot light source belonging to a chromaticity rank area included in the target chromaticity rank area is placed at the end thereof closer to the periphery of the housing.

As the surface light source of the present invention, an illustrative embodiment can be presented where the dot light sources are placed in a matrix on the housing or on a substrate placed on the housing having the same shape as the housing.

In the surface light source of the present invention, the light emitting modules of the present invention may be connected to each other via a connector.

In the surface light source of the present invention, the requirements of the placement of the adjacent dot light sources in each light emitting module described above may be applied to adjacent dot light sources over adjacent light emitting modules.

The present invention also provides a liquid crystal display having the surface light source of the present invention, an optical sheet, and a liquid crystal panel. The liquid crystal panel performs display using the light from the surface light source. An example of the optical sheet includes one having the function of dispersing light or rendering light uniform so as to reduce the unevenness in brightness and chromaticity in the plane of the light from the surface light source and improving the brightness in the direction of the display. A plurality of such optical sheets may be prepared, for example. By adopting the rules of arrangement of dot light sources in the light emitting modules according to the present invention, the number of optical sheets can be reduced, thereby reducing the material cost.

According to the liquid crystal display of the present invention, illumination light having a nearly uniform color tone as a whole can be obtained from the surface light source of the present invention. Therefore, good display with suppressed or reduced display unevenness can be achieved in the liquid crystal display.

The liquid crystal display of the present invention is applicable to a variety of uses, such as displays of TV receivers and personal computers, for example, and in particular suitable for large-size screens.

The present invention also provides an illuminating device having the surface light source of the present invention and a diffuser.

According to the illuminating device of the present invention, illumination light having a nearly uniform color tone in the surface light source as a whole can be obtained. Therefore, good display with suppressed or reduced display unevenness can be achieved also in the illuminating device.

The dot light sources can be electrically connected in series to each other. With this connection, since the same current can be supplied to the dot light sources and thus the light emission amounts from the dot light sources can be rendered uniform, the brightness uniformity on the illumination surface of the illuminating device can be improved. The dot light sources may be connected in parallel or in parallel series.

Effects of the Invention

As described above, according to the present invention, the adjacent dot light sources satisfy the relationships $$\Delta X1 + \Delta X2 = \Delta X \times 2$$

and $$\Delta Y1 + \Delta Y2 = \Delta Y \times 2$$

so that the resultant mixed color can fall within the target chromaticity rank area, and the center of the first chromaticity rank area and the center of the second chromaticity rank area are axisymmetric with respect to a virtual straight line that passes through the center of the target chromaticity rank area and is parallel to the one side or the another side of the target chromaticity rank area. Therefore, in arranging the plurality of dot light sources on the substrate, the adjacent dot light sources can be placed so that the resultant mixed color of light can fall within the target chromaticity rank area. Thus, it is possible to provide a light emitting module, a surface light source, a liquid crystal display, and an illuminating device that can obtain illumination light having a nearly uniform color tone as a whole.

BRIEF DESCRIPTION OF DRAWINGS

FIG. 8 shows chromaticity diagrams illustrating the state where, in the CIE 1931 coordinates with the chromaticity values of mass-produced white LEDs using a red phosphor and a green phosphor plotted on the chromaticity diagram shown in FIG. 7, the values approximately fall within a target chromaticity rank area, in which (a) is a view showing an example and (b) is a view showing another example.

FIG. 9 shows chromaticity diagrams illustrating the state where, in the CIE 1931 coordinates with the chromaticity values of mass-produced white LEDs using a red phosphor and a green phosphor plotted on the chromaticity diagram shown in FIG. 7, the center of the linear variations is deviated from that in FIG. 8, in which (a) is a view showing an example and (b) is a view showing another example.

DESCRIPTION OF EMBODIMENTS

Embodiments of the present invention will be described hereinafter with reference to the accompanying drawings. It should be noted that the embodiments to follow are mere illustrations of the present invention and are not intended to limit the technical scope of the invention.

Figure 1:
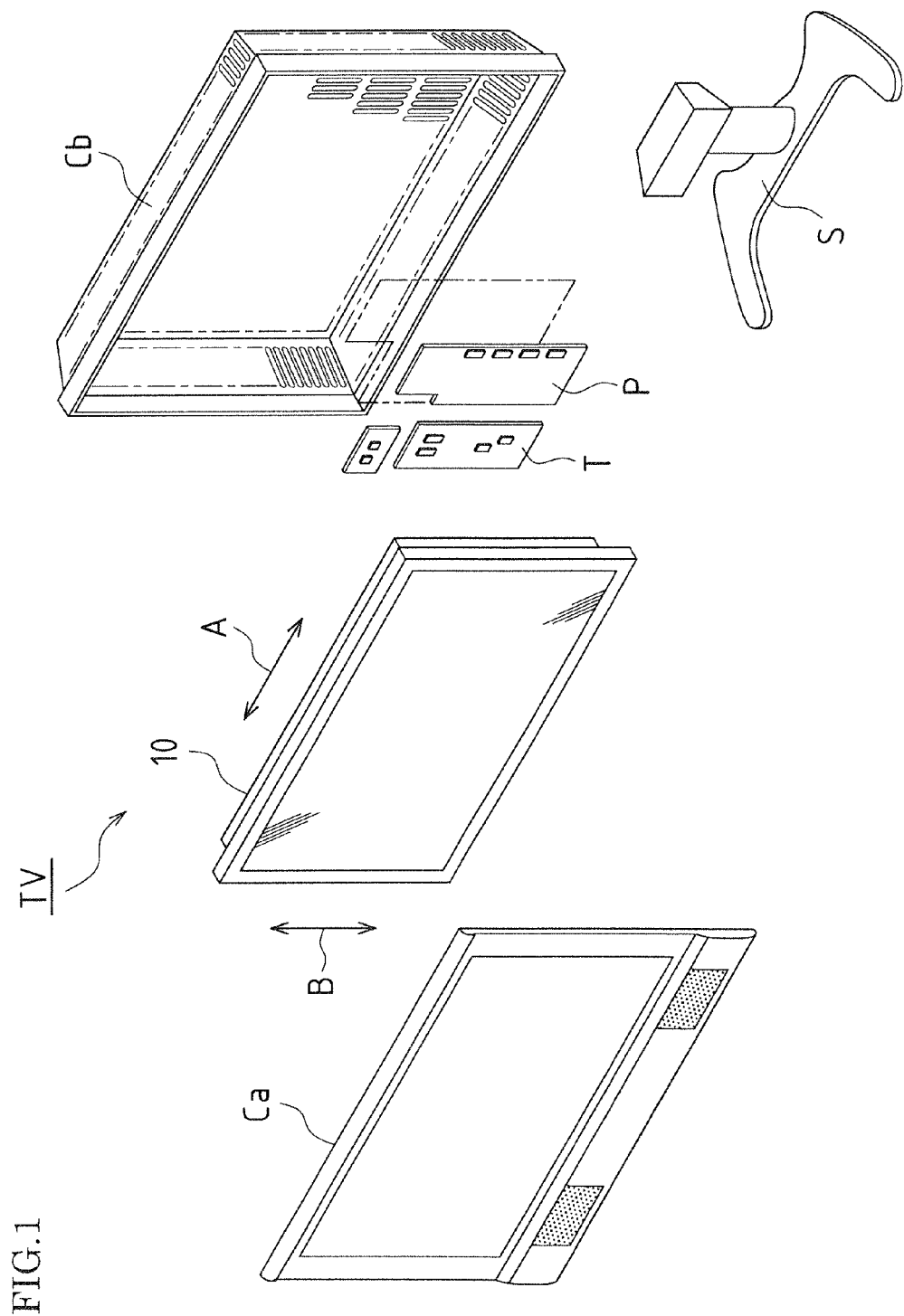
FIG. 1 is an exploded perspective view showing a schematic configuration of a TV receiver having a liquid crystal display of an embodiment of the present invention.

First, the configuration of a television receiver TV having a liquid crystal display 10 will be described. FIG. 1 is an exploded perspective view showing a schematic configuration of the television receiver TV having the liquid crystal display 10 of an embodiment of the present invention.

Figure 2:
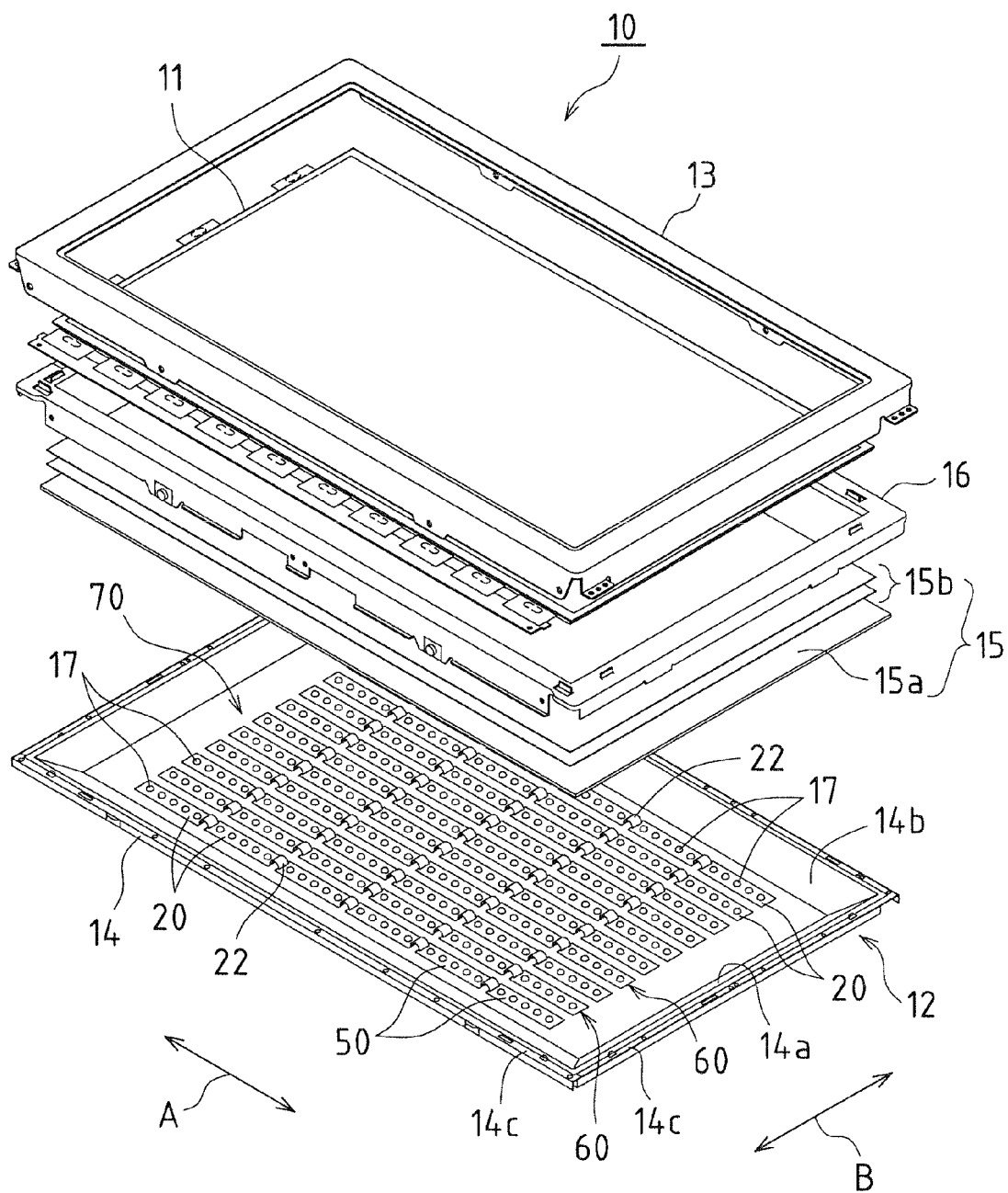
FIG. 2 is an exploded perspective view showing a schematic configuration of the liquid crystal display of the TV receiver.
Figure 3:
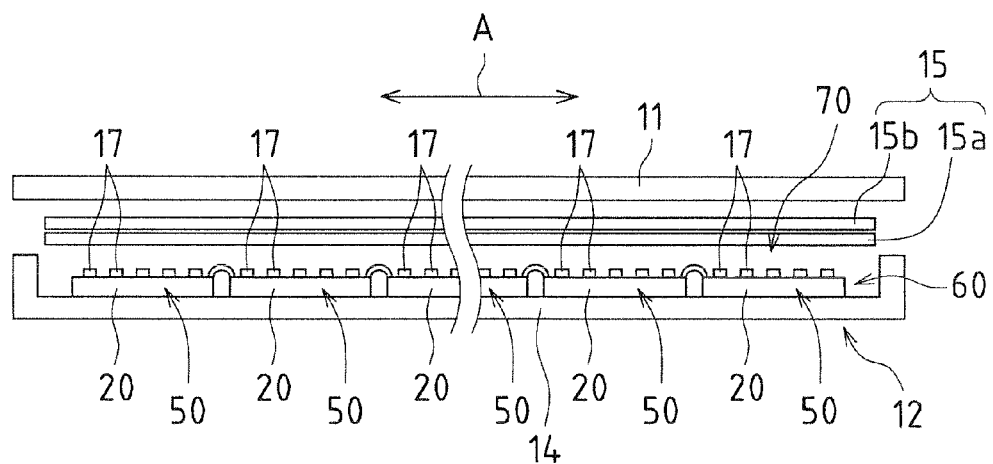
FIG. 3 is a cross-sectional view showing a schematic configuration of the liquid crystal display.

FIG. 2 is an exploded perspective view showing a schematic configuration of the liquid crystal display 10 of the television receiver TV, and FIG. 3 is a cross-sectional view showing a schematic configuration of the liquid crystal display 10.

As shown in FIG. 1, the television receiver TV includes the liquid crystal display 10, front and back cabinets Ca and Cb configured to house the liquid crystal display 10 by sandwiching the liquid crystal display 10 therebetween, a power supply P, a tuner T, and a stand S.

The liquid crystal display 10 has a horizontally long rectangular shape as a whole and is housed in an upright position. As shown in FIG. 2, the liquid crystal display 10 includes a liquid crystal panel 11 and a backlight device 12 (an example of illuminating device), which is an external light source, and these elements are held integrally with a holding member such as a frame-shaped bezel 13.

Next, the liquid crystal panel 11 and the backlight device 12 constituting the liquid crystal display 10 will be described.

The liquid crystal panel 11 includes a pair of glass substrates bonded together with a predetermined gap therebetween and a liquid crystal material sealed in the gap between the glass substrates, although detailed illustration of the components is omitted.

On one of the glass substrates, placed are switching elements (e.g., TFTs) connected to source lines and gate lines intersecting at right angles, pixel electrodes connected to the switching elements, an alignment film, etc. On the other glass substrate, placed are color filters having colored portions such as red (R), green (G), and blue (B) arranged in a predetermined pattern, a counter electrode, an alignment film, etc. Polarizing plates are placed on the outer surfaces of the substrates.

As shown in FIG. 2, the backlight device 12 includes a chassis 14 (an example of housing) in a box-like shape opening on the light emission side (side closer to the liquid crystal panel 11), an optical sheet group 15 (including a diffuser 15a and one or a plurality of optical sheet(s) 15b placed between the diffuser 15a and the liquid crystal panel 11) placed to cover the opening of the chassis 14, and a frame 16 placed along the periphery of the chassis 14 holding the outer edges of the diffuser 15a by sandwiching the outer edges with the chassis 14. Inside the chassis 14, light emitting modules 50 are placed, each of which has a plurality of light emitting diodes 17 emitting white light (an example of dot light sources; hereinafter referred to as white LEDs) and an LED substrate 20 (an example of substrate) on which the plurality of white LEDs 17 are arranged. Note that, in the backlight device 12, the side of the white LEDs 17 facing the diffuser 15a is the light emitting side.

The chassis 14, made of a metal, has a bottom plate 14a in a rectangular shape like the liquid crystal panel 11, side plates 14b standing from the outer edges of the bottom plate 14a, and receiver plates 14c overhanging from the top ends of the side plates 14b outwardly, thereby forming a shallow box-like shape open to the front side as a whole.

Figure 4:
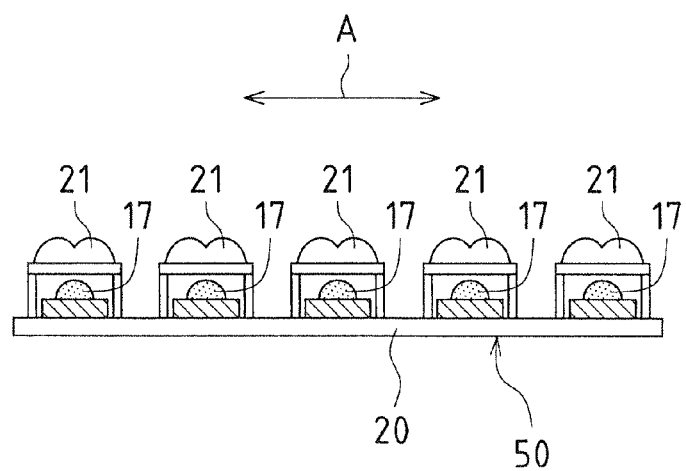
FIG. 4 is a cross-sectional view schematically showing a light emitting module.

FIG. 4 is a cross-sectional view schematically showing the light emitting module 50. As shown in FIG. 4, the light emitting module 50 includes lens members 21 (hereinafter referred to as diffusion lenses). The diffusion lenses 21 are placed on the white LEDs 17 for widening the angle in the light distribution property of the light emitted from the white LEDs 17. The reason for this is to enhance the color mixture property of the light between the adjacent white LEDs 17 and 17, thereby reducing the unevenness in the emission brightness and/or chromaticity of a surface light source 70 (see FIG. 2) to be described later.

The diffusion lenses 21 are secured to the LED substrate 20 (mount substrate). An optical sheet for reducing the brightness/chromaticity unevenness, an optical sheet for improving the brightness in the immediately upward direction, etc. are placed on the diffusion lenses 21. The liquid crystal panel 11 is placed on these optical sheets. In place of the use of the diffusion lenses 21, a light diffusion sheet may be used, or dot light sources with a widened angle in the light distribution property may be used.

To state more specifically, the frame 16 is placed on the receiver plates 14c of the chassis 14, with the outer edges of the optical sheet group 15 being sandwiched between the receiver plates 14c and the frame 16.

The optical sheet group 15 including the diffuser 15a and the optical sheets 15b is placed on the opening side of the chassis 14. The diffuser 15a, having light scattering particles dispersed in a synthetic resin plate, has the function of diffusing light dots emitted from the white LEDs 17. With the outer edges of the diffuser 15a sitting on the receiver plates 14c of the chassis 14 as described above, the diffuser 15a is free from undergoing strong upward/downward force.

The optical sheets 15b placed on the diffuser 15a are thinner than the diffuser 15a and in the form of lamination of two sheets. Specific examples of the optical sheets 15b include a diffusion sheet, a lens sheet, a reflective polarizing sheet, etc., and any of these types of sheets can be selected appropriately and used. The optical sheets 15b have the function of changing the light that has been emitted from the white LEDs 17 and has passed through the diffuser 15a to surface light. The liquid crystal panel 11 is placed on the upper side of the optical sheets 15b.

The LED substrates 20 each having the white LEDs 17 and the diffusion lenses 21 attached thereto are placed on the inner surface of the bottom plate 14a of the chassis 14. The LED substrate 20 is made of a synthetic resin, and has an interconnect pattern made of a metal film such as copper foil formed thereon.

In this embodiment, the LED substrate 20 is long shaped. The light emitting module 50 has, on the surface of the rectangular LED substrate 20, the interconnect pattern (not shown) and a pattern of a plurality of lands (not shown) formed along the length of the LED substrate 20.

A plurality of (five in the illustrated example) white LEDs 17 are placed on the LED substrate 20. Each white LED 17 in this embodiment is a dot light source where a blue LED chip is covered with a sealing resin containing red and green phosphors.

The white LEDs 17 are arranged linearly (in one line) in the row direction (direction of arrow A in the drawings), or along the length of the LED substrate 20 in the illustrated example. The white LEDs 17 are placed on the surface of the LED substrate 20 at equal intervals, and are light source devices having the same configuration (structure). The white LEDs 17 are electrically connected in series to one another via the interconnect pattern formed on the LED substrate 20.

A plurality of (six in the illustrated example) light emitting modules 50 arranged in the direction of arrangement of the white LEDs 17 (row direction A) constitute an illumination module 60.

Figure 5:
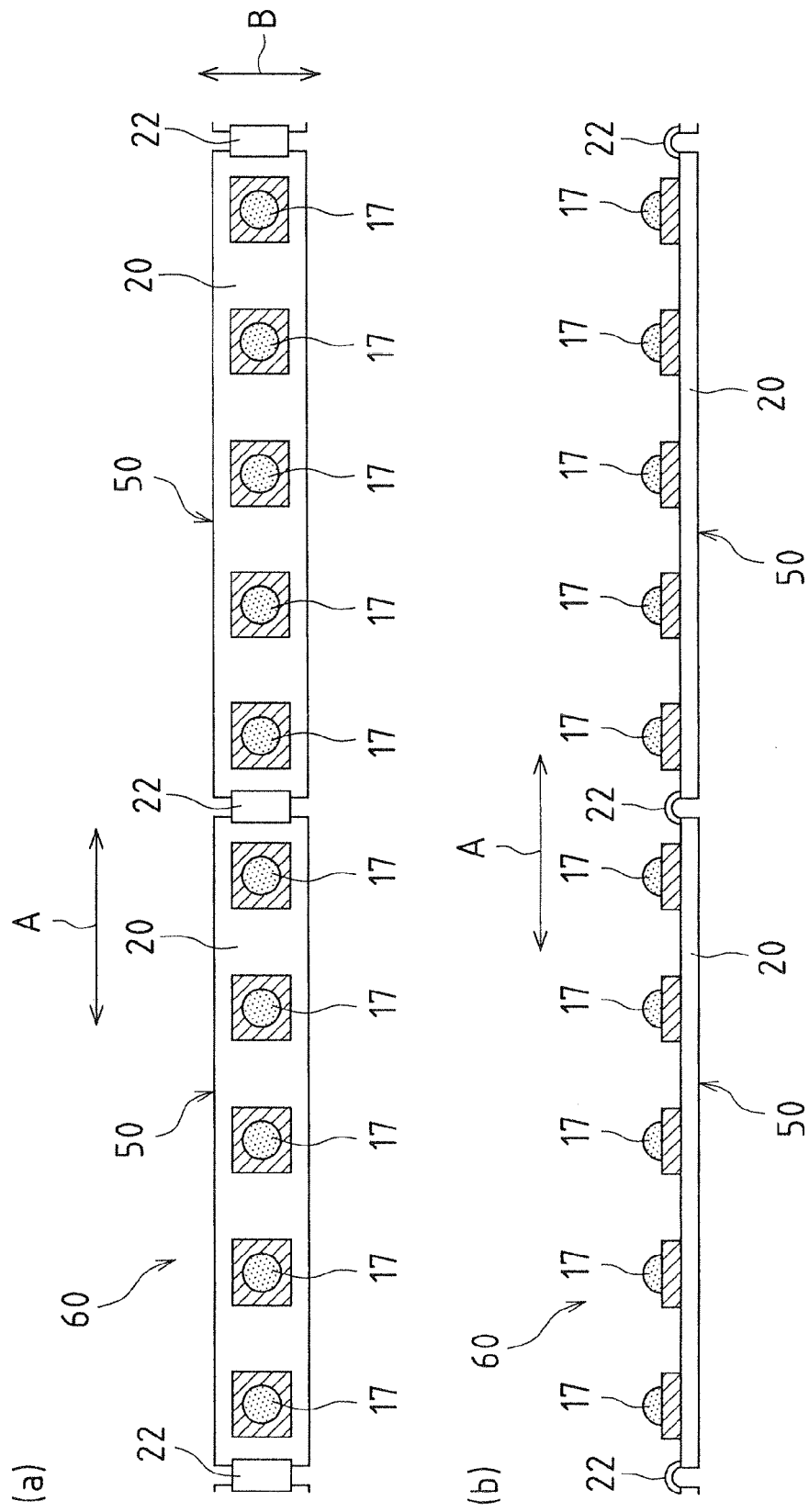
FIG. 5 schematically shows some light emitting modules in an illumination module, in which (a) is a plan view and (b) is a side view.

FIG. 5 schematically shows some light emitting modules 50 in the illumination module 60, where FIG. 5($a$) is a plan view and FIG. 5($b$) is a side view. Note that the diffusion lenses 21 are omitted in FIG. 5.

The illumination module 60 has connectors 22 for electrically and physically connecting the interconnect patterns at the ends of the adjacent light emitting modules 50 in the row direction A (length direction).

As the light emitting modules 50, a plurality of (six in the illustrated example) LED substrates 20, ..., 20 are lined in the row direction A (direction of the long sides of the chassis 14) with their long sides aligned in the same direction, and electrically and physically connected to one another via the connectors 22, thereby constituting the illumination module 60. The pitch of the white LEDs 17 in the illumination module 60 may be made equal.

Such illumination modules 60 are arranged in the chassis 14 in the column direction (direction of arrow B in the drawings) orthogonal to the row direction A. That is, the light emitting modules 50 are formed in a matrix in the row direction A and the column direction B.

Figure 6:
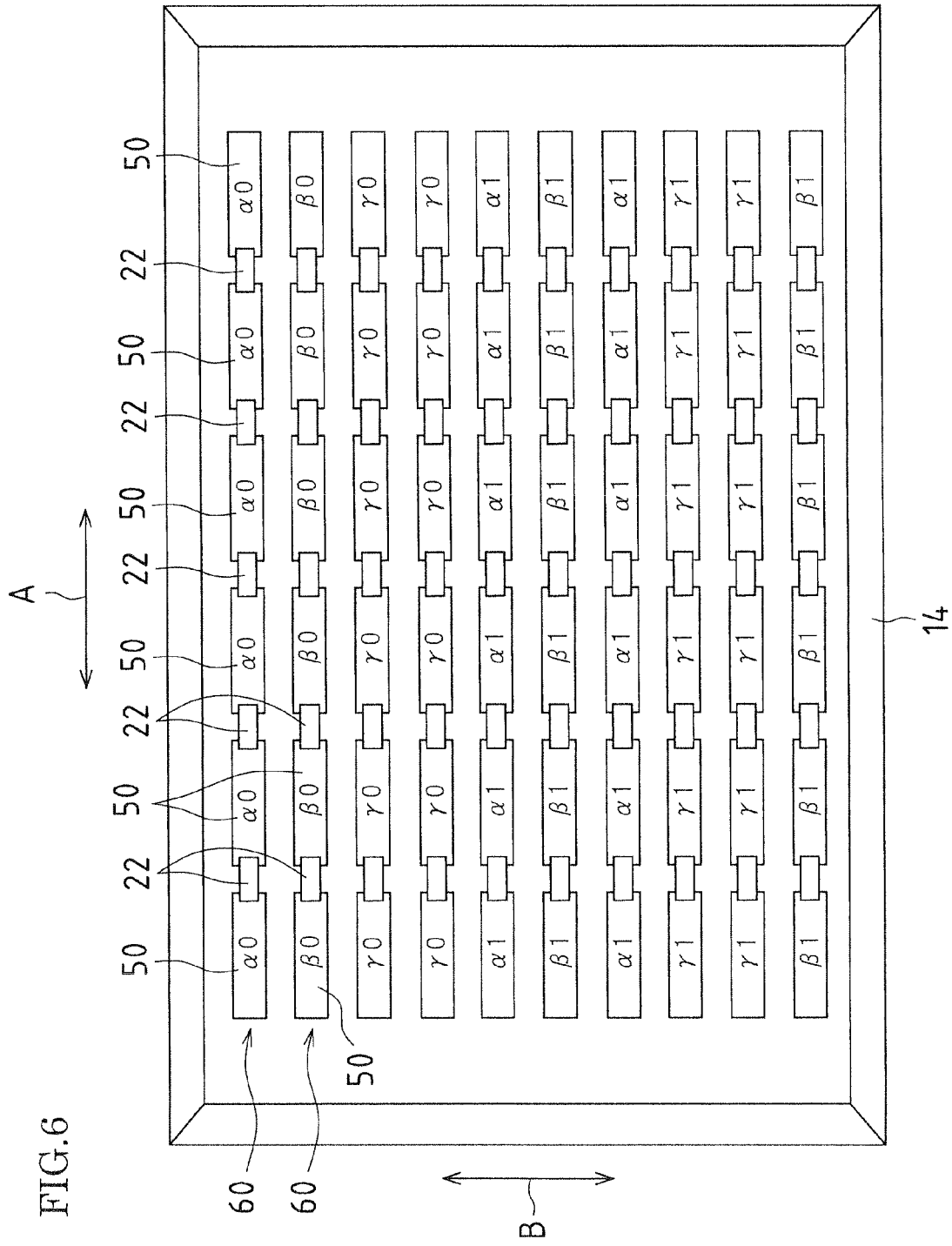
FIG. 6 is a plan view showing light emitting modules arranged in a matrix.

FIG. 6 is a plan view showing the arrangement of the light emitting modules 50 in a matrix. Codes $\alpha 0$, $\beta 0$, $\gamma 0$, $\alpha 1$, $\beta 1$, and $\gamma 1$ given on the light emitting modules 50 in FIG. 6 will be described later in detail.

As shown in FIG. 6, a plurality of (ten in the illustrated example) illumination modules 60 are placed in parallel in the column direction B (direction of the short sides of the chassis 14), thereby constituting the surface light source 70. The pitch of the white LEDs 17 in the surface light source 70 may be made equal.

Note that an external control unit not shown is connected to the LED substrates 20, to permit supply of power necessary for lighting of the white LEDs 17, as well as drive control of the white LEDs 17, from the control unit.

The white LED 17 is made to emit white light by sealing a blue LED chip emitting blue light as single color light housed in a package or placed on a substrate with a light-transmissive sealing resin containing a red phosphor and a green phosphor. A yellow phosphor may be used instead. Alternatively, the white LED 17 may be made to emit white light by applying a phosphor having a light emission peak in the yellow region, for example. Otherwise, the white LED 17 may be made to emit white light by applying a phosphor having light emission peaks in the green and red regions to a blue light emitting chip, for example. Otherwise, the white LED 17 may be made to emit white light by applying a phosphor having a light emission peak in a green region to a blue light emitting chip and combining the resultant chip with a red chip. Otherwise, the white LED 17 may be made to emit white light by combining blue, green, and red light emitting chips.

Figure 7:
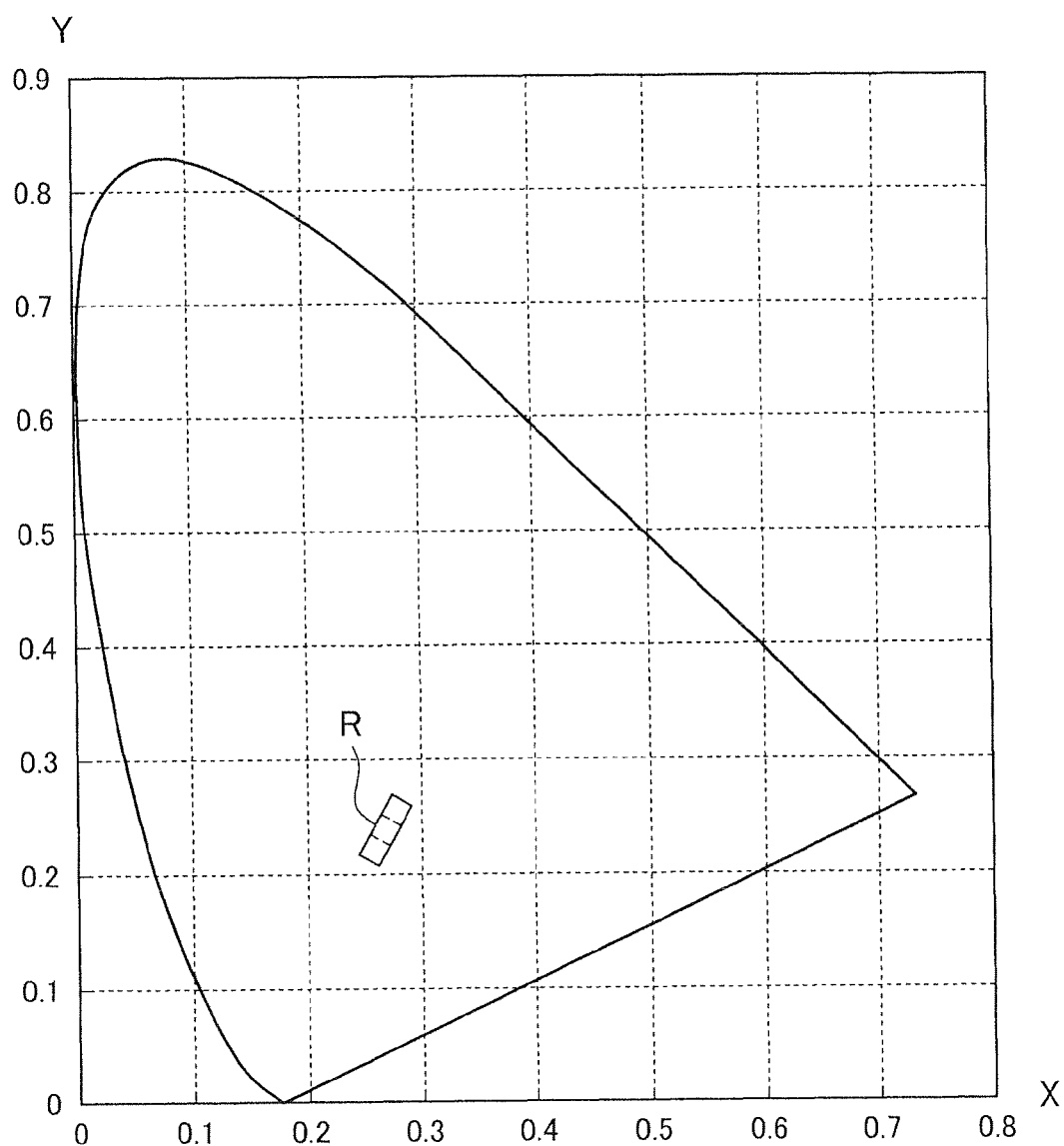
FIG. 7 is a chromaticity diagram laid down in 1931 by the International Commission on Illumination (CIE).

All of such white LEDs 17 do not exhibit the same tone of white color. The wavelength spectrum changes with a change in the intensity ratio of fluorescent light to LED light (blue light) due to the phosphor blend quantity, the thickness of the sealing resin containing the phosphor, variations in the characteristics of the blue LED chips themselves, etc. This generally causes variations in the tone of white color. For this reason, white LEDs are classified into chromaticity ranks in the CIE 1931 coordinates according to their chromaticity values. FIG. 7 shows the chromaticity diagram laid down in 1931 by the International Commission on Illumination (CIE).

The white LEDs 17 in this embodiment vary in color tone within the range of region R surrounded by the solid line in the CIE 1931 coordinates in FIG. 7, for example.

FIG. 8 shows the state where, in the CIE 1931 coordinates with the chromaticity values of mass-produced white LEDs 17 using a red phosphor and a green phosphor plotted on the chromaticity diagram shown in FIG. 7, the values approximately fall within a target chromaticity rank area M, in which FIG. 8($a$) shows an example and FIG. 8($b$) shows another example.

FIG. 9 shows the state where, in the CIE 1931 coordinates with the chromaticity values of mass-produced white LEDs 17 using a red phosphor and a green phosphor plotted on the chromaticity diagram shown in FIG. 7, the center of the linear variations is deviated from that in FIG. 8, in which FIG. 9($a$) shows an example and FIG. 9($b$) shows another example.

In FIGS. 8 and 9, the target chromaticity rank area M is the chromaticity rank area within which chromaticity variations are allowed, and the chromaticity target value is at the center of this area.

In the examples of FIG. 8, the chromaticity variations are such that the centers thereof approximately correspond with the chromaticity target value and the variations spread along the linear portion of the blackbody radiation on the chromaticity coordinates. Note however that the chromaticity variations are not necessarily in parallel with the blackbody radiation, but distribute to extend in a slanting direction between the x-axis and the y-axis. For example, the color changes between blue (light from the blue LED chips in this case) and yellow (fluorescent light, specifically a mixed color of red and green, in this case). The variations in this direction are generally considered to occur depending on the thickness of the sealing resin, brightness variations of the blue LED chips, etc.

Incidentally, variations in the direction nearly vertical to the linear portion of the blackbody radiation on the chromaticity coordinates are generally considered to occur depending on the peak wavelength of the blue LED chips, etc.

In the example of FIG. 9($a$), the center of the linear variations is deviated from that in the examples of FIG. 8. The variations in this direction is generally considered to occur when the phosphor blend quantity and the thickness of the sealing resin are largely deviated in the application process of the sealing resin, at the time of exchange of the applying material, etc.

In the example of FIG. 9($b$), the variations are further deviated from the example of FIG. 9($a$) in parallel with the direction of the linear variations. The variations in this direction is generally considered to occur because the phosphor blend ratio (e.g., the intensity ratio between two types of light, green light and red light, obtained from the green phosphor and the red phosphor) has changed causing a deviation from the examples of FIG. 8.

In this embodiment, in forming the light emitting modules 50 by placing a plurality of white LEDs 17 thereon, not only white LEDs of which the chromaticity approximately falls within the target chromaticity rank area M as shown in FIG. 8, but also white LEDs of which the chromaticity is deviated from the target chromaticity rank area M as shown in FIG. 9, are used, and yet the resultant light emitting modules 50 are free from chromaticity unevenness as the surface light source 70.

By achieving the above, it is possible to reduce the dead stock of white LEDs of which the chromaticity is largely deviated from the target chromaticity rank area M and thus achieve cost reduction. The light emitting modules 50 may be used as linear light sources individually or in connection with each other. It is preferable to place a diffuser and an optical sheet for diffusing minimum light on the surface light source 70 and the linear light sources.

For the light emitting module 50 in this embodiment, a plurality of white LEDs 17 are prepared in a mixed state of the distributions in FIGS. 8 and 9, for example. The distributions are classified into chromaticity ranks, and the white LEDs 17 are selected according to the arrangement rules to be described later based on the rank data and placed on the LED substrates 20.

In the light emitting module 50 in this embodiment, the white LEDs 17 are classified into chromaticity ranks each forming a quadrangle (specifically, a parallelogram) on the CIE 1931 coordinates in accordance with their color tones.

A plurality of chromaticity rank classifying methods are presented, and each white LED 17 may have a plurality of rank data units. The basic idea on the arrangement method of the white LEDs 17 under setting of chromaticity rank areas will be described hereinafter with reference to FIG. 10.

<Basic Idea on Arrangement Method of White LEDs Under Setting of Chromaticity Rank Areas>

In arranging the white LEDs 17 on each LED substrate 20, by selecting and placing the adjacent white LEDs 17 so that the mixed color of light (the average value of the chromaticity of the adjacent white LEDs 17 and 17) can fall within the target chromaticity rank area M, illumination light having a nearly uniform color tone as a whole can be obtained. The arrangement method of the white LEDs 17 is based on the above findings.

Figure 10:
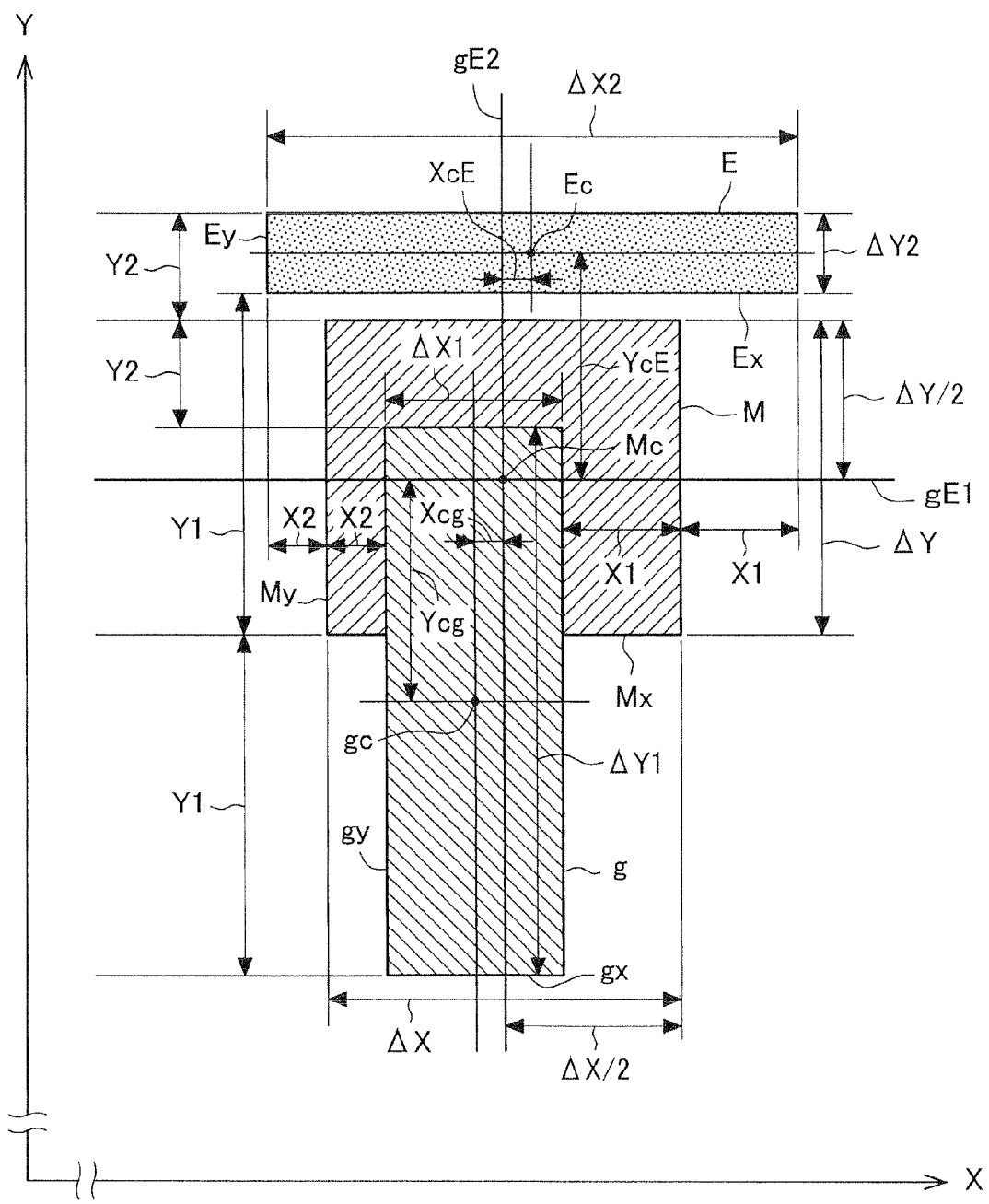
FIG. 10 is a graph showing the CIE 1931 coordinates presented to describe an arrangement method of white LEDs involving setting of chromaticity rank areas.

FIG. 10 is a graph showing the CIE 1931 coordinates presented to describe the arrangement method of the white LEDs 17 under setting of chromaticity rank areas. Note that, although all of the target chromaticity rank area M, a first chromaticity rank area g, and a second chromaticity rank area E are in the shape of a parallelogram in this embodiment, these chromaticity rank areas are illustrated as rectangles whose sides are in parallel with the orthogonal coordinates on the CIE 1931 coordinates in FIG. 10 for simplicity of calculation.

As shown in FIG. 10, one white LED 17, out of two adjacent white LEDs 17 and 17, belongs to the parallelogram-shaped first chromaticity rank area g while the other white LED 17 belongs to the parallelogram-shaped second chromaticity rank area E.

One side, or another side not in parallel with the one side (another side adjacent to the one side), of each of the first and second chromaticity rank areas g and E is parallel to one side, or another side not in parallel with the one side (another side adjacent to the one side), of the parallelogram-shaped target chromaticity rank area M.

Assume herein that the x-coordinate difference that is a chromaticity coordinate difference of one side Mx of the target chromaticity rank area M projected on the x-axis is $\Delta X$, where the one side Mx is the side that can be directly projected on the x-axis, and the y-coordinate difference that is a chromaticity coordinate difference of another side My of the target chromaticity rank area M projected on the y-axis is $\Delta Y$, where the another side My is the side that can be directly projected on the y-axis.

Also, assume herein that the x-coordinate difference that is a chromaticity coordinate difference of one side gx of the first chromaticity rank area g projected on the x-axis is $\Delta X1$, where the one side gx is the side that can be directly projected on the x-axis, and the y-coordinate difference that is a chromaticity coordinate difference of another side gy of the first chromaticity rank area g projected on the y-axis is $\Delta Y1$, where the another side gy is the side that can be directly projected on the y-axis.

Likewise, assume herein that the x-coordinate difference that is a chromaticity coordinate difference of one side Ex of the second chromaticity rank area E projected on the x-axis is $\Delta X2$, where the one side Ex is the side that can be directly projected on the x-axis, and the y-coordinate difference that is a chromaticity coordinate difference of another side Ey of the second chromaticity rank area E projected on the y-axis is $\Delta Y2$, where the another side Ey is the side that can be directly projected on the y-axis.

And, to ensure that the mixed color can fall within the target chromaticity rank area M, the first and second chromaticity rank areas g and E are set so that the relationships $$\Delta X1 + \Delta X2 = \Delta X \times 2$$

and $$\Delta Y1 + \Delta Y2 = \Delta Y \times 2$$

are satisfied and that the center gc of the first chromaticity rank area g and the center Ec of the second chromaticity rank area E are axisymmetric with respect to virtual straight lines gE1 and gE2 that pass through the center Mc of the target chromaticity rank area M and are parallel to the one side or the another side of the target chromaticity rank area M.

The target chromaticity rank area M is also a chromaticity area within which the resultant mixed color between a white LED having an arbitrary chromaticity value belonging to the first chromaticity rank area g and a white LED having an arbitrary chromaticity value belonging to the second chromaticity rank area E can fall when these white LEDs are placed adjacent to each other.

In the example shown in FIG. 10, it is assumed that the chromaticity variations are parallel to the y-axis direction. In this case, the lengths of the sides of each area are as shown in FIG. 10. Under this assumption, the following relational expressions are established.

That is, any combination of white LEDs 17 and 17 belonging to third and fourth chromaticity rank areas g1 and E1 that are respectively inside the maximum-sized first and second chromaticity rank areas g and E satisfying Expressions (a) to (d) below will fall within the target chromaticity rank area M without fail.

$$\Delta X1 + \Delta X2 = \Delta X \times 2 \tag{a}$$

from $\Delta X - \Delta X1 = \Delta X2 - \Delta X = X1 + X2$ $$\Delta Y1 + \Delta Y2 = \Delta Y \times 2 \tag{b}$$

from $\Delta Y1 + Y2 - \Delta Y = Y1$, $Y1 - \Delta Y = Y2 - \Delta Y2$ $$XcE = Xcg \tag{c}$$

from Expression (a) and $XcE = X1 + \Delta X/2 - \Delta X2/2$, $Xcg = X1 - \Delta X/2 + \Delta X1/2$ $$YcE = Ycg \tag{d}$$

from Expression (b) and $YcE = Y2 - \Delta Y2/2 + \Delta Y/2$, $Ycg = \Delta Y1/2 - (\Delta Y/2 - Y2)$ Expressions (c) and (d) indicate that the centers gc and Ec of the first and second chromaticity rank areas g and E are symmetric with respect to the virtual straight lines gE1 and gE2 that pass through the center Mc of the target chromaticity rank area M.

In other words, in order to ensure that the resultant mixed color can fall within the target chromaticity rank area M when white LEDs having arbitrary chromaticity values belonging to the first and second chromaticity rank areas g and E are placed adjacent to each other, the total of the lengths of the sides of the first and second chromaticity rank areas g and E in the same direction (X and Y) has to be twice as large as the length of the side of the target chromaticity rank area M in the same direction.

Moreover, the centers gc and Ec of the first and second chromaticity rank areas g and E have to be symmetric with respect to the axis (virtual straight line) gE1 in the X direction, or the axis (virtual straight line) gE2 in the Y direction, passing through the center Mc of the target chromaticity rank area M.

By setting the third and fourth chromaticity rank areas g1 and E1 inside the first and second chromaticity rank areas g and E, respectively, when white LEDs having arbitrary chromaticity values belonging to the third and fourth chromaticity rank areas g1 and E1 are placed adjacent to each other, the resultant mixed color will fall within the target chromaticity rank area M without fail irrespective of the sizes and shapes of the chromaticity rank areas.

Expressions (c) and (d) also indicate, when viewed from another perspective, that the centers gc and Ec of the first and second chromaticity rank areas g and E are at positions symmetric with respect to the center Mc of the target chromaticity rank area M.

The third and fourth chromaticity rank areas g1 and E1 can be of any size and shape and at any position as far as they are respectively inside the first and second chromaticity rank areas g and E. In reality, however, it is preferable that they have a quadrangular shape for easiness of classification.

Note that, in the case of setting the first and second chromaticity rank areas g and E as the rank areas, when white LEDs having arbitrary chromaticity values belonging to the first and second chromaticity rank areas g and E are placed adjacent to each other, the resultant mixed color will be the target chromaticity rank area M itself.

As described above, according to the light emitting module 50 in this embodiment, the adjacent white LEDs 17 and 17 satisfy the relationships $$\Delta X1 + \Delta X2 = \Delta X \times 2$$

and $$\Delta Y1 + \Delta Y2 = \Delta Y \times 2$$

so that the mixed color of light can fall within the target chromaticity rank area M, and the center gc of the first chromaticity rank area g and the center Ec of the second chromaticity rank area E are axisymmetric with respect to the virtual straight lines gE1 and gE2 (symmetric with respect to the center Mc). Therefore, in arranging the white LEDs 17 on the LED substrate 20, the adjacent white LEDs 17 and 17 can be selected and placed so that the mixed color of light can fall within the target chromaticity rank area M, whereby illumination light having a nearly uniform color tone as a whole can be obtained.

Next, actual examples of setting of the chromaticity rank areas will be described with reference to FIGS. 11 to 14.

<Actual Chromaticity Rank Area Setting Examples>

Two Setting Examples 1 and 2 set for the example distributions of chromaticity variations of the white LEDs 17 will be described hereinafter.

Setting Example 1 is an example of setting for white LEDs 17 having a chromaticity variation distribution approximately falling within the target chromaticity rank area M as shown in FIG. 8. Setting Example 2 is an example of setting for white LEDs 17 having a chromaticity variation distribution deviated from the target chromaticity rank area M as shown in FIG. 9.

In reality, the white LEDs 17 are prepared in a mixed state of the distributions in FIGS. 8 and 9, and thus some white LEDs 17 may be ranked according to both Setting Examples 1 and 2.

Figure 11:
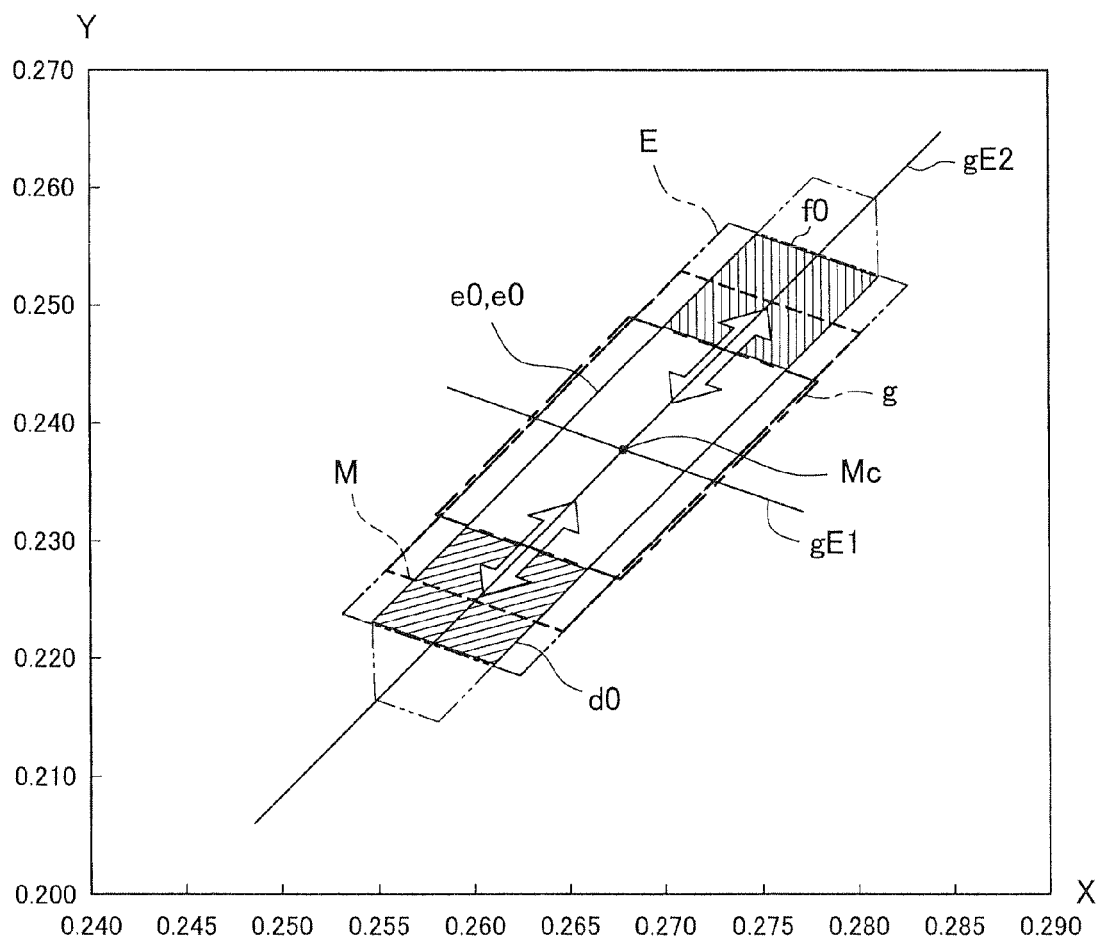
FIG. 11 is a graph of the CIE 1931 coordinates showing an example of chromaticity rank areas set in Setting Example 1.
Figure 12:
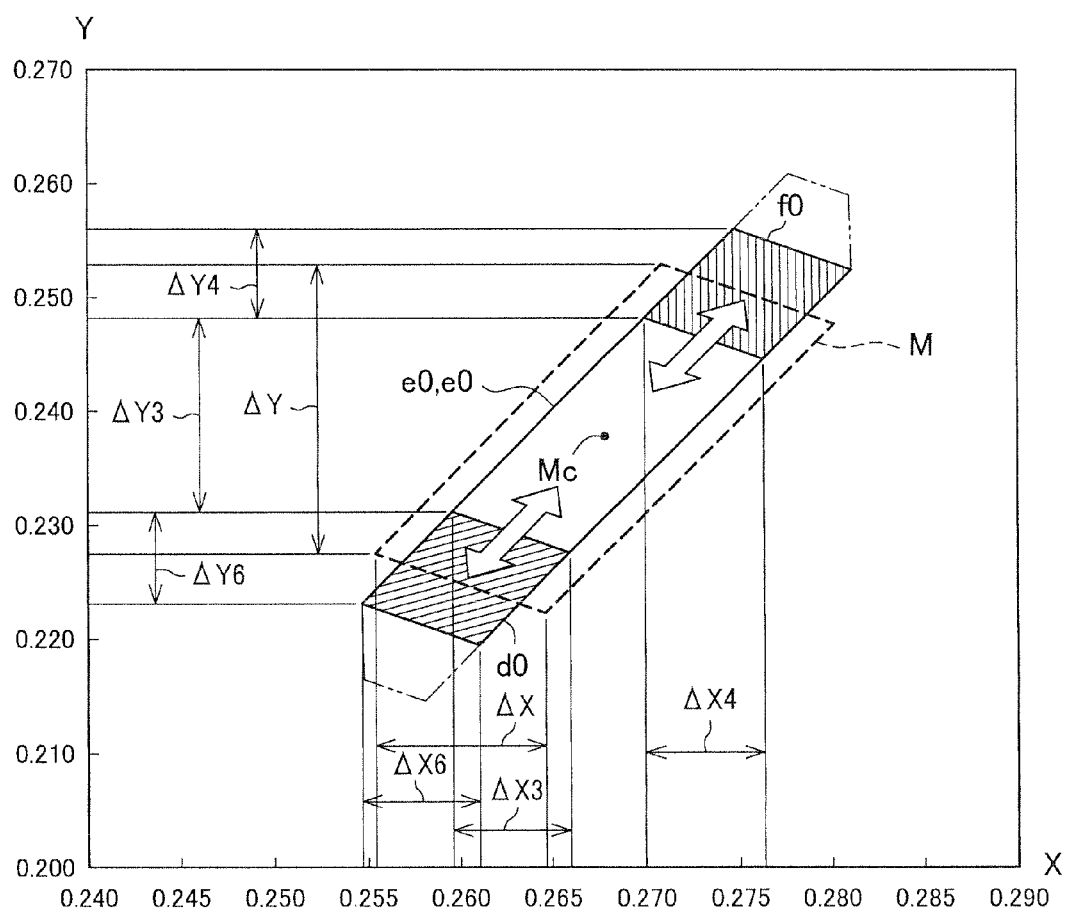
FIG. 12 is a graph of the CIE 1931 coordinates showing the example of chromaticity rank areas set in Setting Example 1.
Figure 13:
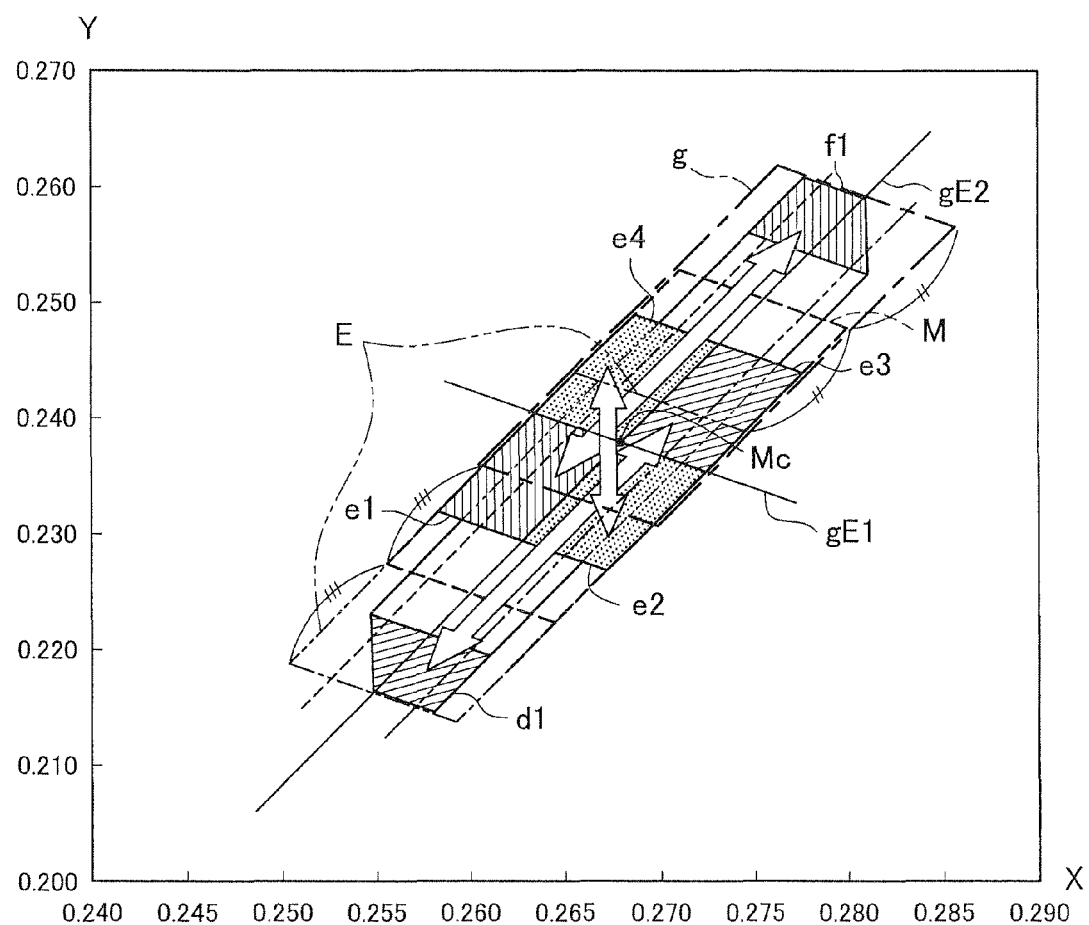
FIG. 13 is a graph of the CIE 1931 coordinates showing an example of chromaticity rank areas set in Setting Example 2.
Figure 14:
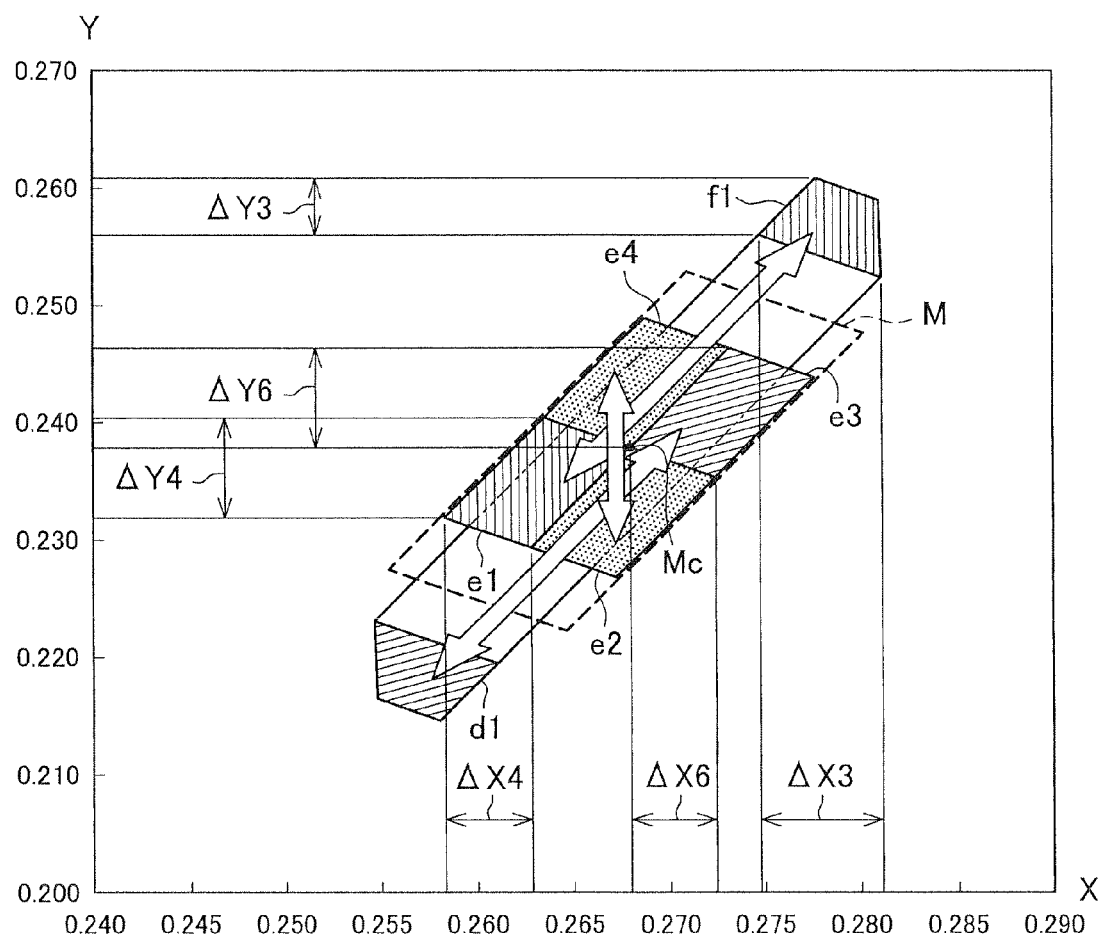
FIG. 14 is a graph of the CIE 1931 coordinates showing the example of chromaticity rank areas set in Setting Example 2.

FIGS. 11 and 12 are graphs of the CIE 1931 coordinates showing an example of chromaticity rank areas set in Setting Example 1. FIGS. 13 and 14 are graphs of the CIE 1931 coordinates showing an example of chromaticity rank areas set in Setting Example 2.

Note that, although the second chromaticity rank area E is partly omitted in FIGS. 11 and 13, it is actually at a position symmetric to the first chromaticity rank area g with respect to the center Mc of the target chromaticity rank area M. Note also that the first and second chromaticity rank areas g and E are set to have completely different chromaticity area ranges between FIGS. 11 and 13.

[Common Items of Chromaticity Rank Area Setting Examples 1 and 2]

In Setting Examples 1 and 2, one white LED 17 of the adjacent white LEDs 17 and 17 belongs to a third chromaticity rank area (e0 in FIGS. 11 and 12, f1 in FIGS. 13 and 14) included in the first chromaticity rank area g. The third chromaticity rank area (e0, f1) is an area smaller in size than the first chromaticity rank area g.

The other white LED 17 of the adjacent white LEDs 17 and 17 belongs to a fourth chromaticity rank area (f0 in FIGS. 11 and 12, e1 in FIGS. 13 and 14) included in the second chromaticity rank area E. The fourth chromaticity rank area (f0, e1) is an area smaller in size than the second chromaticity rank area E. Note that the first chromaticity rank area g and the second chromaticity rank area E are chromaticity ranges (chromaticity rank areas) within which the white LEDs 17 and 17 placed adjacent to each other on the substrate should fall, presented to ensure that the resultant mixed color of the white LEDs 17 and 17 can fall within the target chromaticity rank area M, based on the <Basic Idea on Arrangement Method of White LEDs under Setting of Chromaticity Rank Areas> described above.

Also, in Setting Examples 1 and 2, the one and the other white LEDs 17 and 17, of the adjacent white LEDs 17 and 17, may respectively belong to a fifth chromaticity rank area (e0 in FIGS. 11 and 12, d1 in FIGS. 13 and 14) and a sixth chromaticity rank area (d0 in FIGS. 11 and 12, e3 in FIGS. 13 and 14) that are respectively placed at positions symmetric to the third chromaticity rank area (e0, f1) and the fourth chromaticity rank area (f0, e1) with respect to the center Mc of the target chromaticity rank area M. The fifth chromaticity rank area (e0, d1) and the sixth chromaticity rank area (d0, e3) are respectively the same in shape as the third chromaticity rank area (e0, f1) and the fourth chromaticity rank area (f0, e1). Incidentally, the codes e2 and e4 in FIGS. 13 and 14 denote seventh and eighth chromaticity rank areas respectively included in the second chromaticity rank area E and the first chromaticity rank area g, which are at positions symmetric with respect to the center Mc of the target chromaticity rank area M and also axisymmetric to the fourth and sixth chromaticity rank areas e1 and e3 with reference to the virtual straight line gE2.

Moreover, in Setting Examples 1 and 2, the third chromaticity rank area (e0, f1) is in the shape of a parallelogram of which one side and another side not in parallel with the one side are respectively parallel to one side and another side not in parallel with the one side of the target chromaticity rank area M. Note that, in Setting Example 2, the third chromaticity rank area f1 may be in the shape of a trapezoid formed by cutting away part of the parallelogram, as shown in FIGS. 13 and 14. In this case, the fifth chromaticity rank area d1, which is symmetric to the third chromaticity rank area f1 with respect to the center Mc of the target chromaticity rank area M, should also be in the shape of a trapezoid formed by cutting away part of the parallelogram, as shown in FIGS. 13 and 14.

In Setting Examples 1 and 2, also, the third chromaticity rank area (e0, f1) and the fourth chromaticity rank area (f0, e1) are areas smaller in size than the target chromaticity rank area M.

The target chromaticity rank area M is included in a square chromaticity area whose center is the set chromaticity point of white LEDs (chromaticity point (0.268, 0.238), which corresponds with the center Mc) where the chromaticity coordinate differences $\Delta X$ and $\Delta Y$ of one side and another side not in parallel with the one side directly projected on the x-axis and the y-axis, respectively, are 0.02. When evaluated as being used for a liquid crystal display, this square chromaticity area falls within the range of in-plane chromaticity variations required for a backlight (surface light source) of the liquid crystal display. The square chromaticity area (true target chromaticity area) is, as expressed in another way, a square chromaticity area having the vertices at four chromaticity points (Xm+0.01, Ym+0.01), (Xm−0.01, Ym−0.01), (Xm+0.01, Ym−0.01), and (Xm−0.01, Ym+0.01) defined with respect to the set chromaticity point (Xm, Ym) of white LEDs. In this example, Xm=0.268 and Ym=0.238.

The target chromaticity rank area M is an area reset from the square chromaticity area according to the chromaticity variation distribution of white LEDs, and it is preferable that the chromaticity coordinate difference $\Delta X$ as the chromaticity coordinate difference of one side of the target chromaticity rank area M that can be directly projected on the x-axis is about 0.01 or less, and the chromaticity coordinate difference $\Delta Y$ as the chromaticity coordinate difference of another side thereof not in parallel with the one side that can be directly projected on the y-axis is about 0.025 or less.

As for the third chromaticity rank area (e0, f1) and the fourth chromaticity rank area (f0, e1), it is preferable that the chromaticity coordinate differences $\Delta X3$ and $\Delta X4$ each as the chromaticity coordinate difference of one side of the area that can be directly projected on the x-axis are both about 0.007 or less, and the chromaticity coordinate differences $\Delta Y3$ and $\Delta Y4$ each as the chromaticity coordinate difference of another side thereof not in parallel with the one side that can be directly projected on the y-axis are both about 0.017 or 0.008 or less.

It is more preferable that both the chromaticity coordinate differences $\Delta X3$ and $\Delta Y3$ of the third chromaticity rank area (e0, f1) are about 0.005 or less.

[Chromaticity Rank Area Setting Example 1]

As shown in FIGS. 11 and 12, the third chromaticity rank area e0 is in the shape of a parallelogram along the direction of chromaticity variations of the white LEDs 17.

In Setting Example 1, the third chromaticity rank area e0 is the same in area as the fifth chromaticity rank area e0.

Also, in Setting Example 1, the third chromaticity rank area e0 is in contact with the fourth chromaticity rank area f0 along one side.

More specifically, Setting Example 1 is an example of setting of the third and fourth chromaticity rank areas e0 and f0 to adjoin each other sharing one side therebetween.

The target chromaticity rank area M is placed to stride the third and fourth chromaticity rank areas e0 and f0. In the target chromaticity rank area M, the length of the one side of the third chromaticity rank area e0 and that of the fourth chromaticity rank area f0 are the same.

The sixth chromaticity rank area d0 is the same in shape as the fourth chromaticity rank area f0, shares one side with the fifth chromaticity rank area e0 on the side included in the target chromaticity rank area M, and is opposed to the fourth chromaticity rank area f0 with the fifth chromaticity rank area e0 interposed therebetween.

The two sides of each of the third and fifth chromaticity rank areas e0 and e0, the fourth chromaticity rank area f0, and the sixth chromaticity rank area d0 in the direction vertical to the shared sides each extend as one straight line.

Also, the third and fifth chromaticity rank areas e0 and e0 whose center corresponds with the center Mc of the target chromaticity rank area M as the target of the chromaticity after the color mixture are set on the chromaticity diagram shown in FIGS. 11 and 12. The third and fifth chromaticity rank areas e0 and e0 are sandwiched between the fourth and sixth chromaticity rank areas f0 and d0 while being in contact with the fourth and sixth chromaticity rank areas f0 and d0. That is, the three chromaticity rank areas f0, e0, and d0 are placed in line.

The third and fourth chromaticity rank areas e0 and f0 are respectively included in the first and second chromaticity rank areas g and E. Therefore, when arbitrary white LEDs 17 and 17 respectively classified into the third and fourth chromaticity rank areas e0 and f0 are placed adjacent to each other on the substrate, the resultant chromaticity after the color mixture falls within the target chromaticity rank area M. This also applies to the fifth and sixth chromaticity rank areas e0 and d0. A similar result will also be obtained for the third and fifth chromaticity rank areas e0 and e0 because these rank areas are included in the first and second chromaticity rank areas g and E.

As shown in FIG. 12, the target chromaticity rank area M is in the shape of a quadrangle, and specifically a parallelogram approximately in parallel with the direction of the chromaticity variations, which has the X-direction chromaticity coordinate difference $\Delta X$ (about 0.01 in the illustrated example) as one side and the Y-direction chromaticity coordinate difference $\Delta Y$ (about 0.025 in the illustrated example) as another side.

The third and fifth chromaticity rank areas e0 and e0 are in the shape of a parallelogram approximately in parallel with the direction of the chromaticity variations, having X-direction chromaticity coordinate differences $\Delta X3$ and $\Delta X3$ (about 0.007 in the illustrated example) as one side and Y-direction chromaticity coordinate differences $\Delta Y3$ and $\Delta Y3$ (about 0.017 in the illustrated example) as another side.

The fourth and sixth chromaticity rank areas f0 and d0 are in the shape of a parallelogram approximately in parallel with the direction of the chromaticity variations, having X-direction chromaticity coordinate differences $\Delta X4$ and $\Delta X6$ (about 0.007 in the illustrated example) as one side and Y-direction chromaticity coordinate differences $\Delta Y4$ and $\Delta Y6$ (about 0.008 in the illustrated example) as another side.

In other words, the X-direction chromaticity coordinate differences of the "one" sides of the third to sixth chromaticity rank areas e0, f0, e0, and d0 are the same, and the "another" sides thereof are on the same line.

[Chromaticity Rank Area Setting Example 2]

As shown in FIGS. 13 and 14, a quadrangular chromaticity area that is included in the target chromaticity rank area M as the target of the chromaticity after color mixture on the chromaticity diagram and has its center at the center of the target chromaticity rank area M is divided into four, to set quadrangular chromaticity rank areas e1 to e4 so that the center of the target chromaticity rank area M is shared as one vertex of each of the four areas.

In Setting Example 2, the third chromaticity rank area f1 is apart from the fourth chromaticity rank area e1 and falls outside the target chromaticity rank area M.

The fourth chromaticity rank area e1 falls within the target chromaticity rank area M as described above.

In Setting Example 2, also, the third chromaticity rank area f1 is the same in shape as the fifth chromaticity rank area d1 and set at a position symmetric to the fifth chromaticity rank area d1 with respect to the center of the target chromaticity rank area M.

The sixth chromaticity rank area e3 falls within the target chromaticity rank area M and yet does not overlap the fourth chromaticity rank area e1 (independent of each other), and is set at a position symmetric to the fourth chromaticity rank area e1 with respect to the center of the target chromaticity rank area M.

Note that the third and fifth chromaticity rank areas f1, d1 are positioned near the centers of off-center distributions of chromaticity variations so that even white LEDs 17 in such distributions can be made usable.

The chromaticity rank areas e1 to e4 are obtained in the following manner: a parallelogram-shaped chromaticity area that is included in the target chromaticity rank area M, has one side and another side respectively parallel to one side and another side not in parallel with the one side of the target chromaticity rank area M, and has the center corresponding with the center Mc is divided into four with the virtual straight lines gE1 and gE2, and the resultant chromaticity areas having the same shape are allocated as the chromaticity rank areas e1 to e4.

As shown in FIG. 14, the fourth chromaticity rank area e1 and the sixth chromaticity rank area e3 are in the shape of a quadrangle having the X-direction chromaticity coordinate differences ΔX4 and ΔX6 (about 0.005 in the illustrated example) as one side and the Y-direction chromaticity coordinate differences ΔY4 and ΔY6 (about 0.008 in the illustrated example) as another side, and specifically in the shape of a parallelogram approximately in parallel with the direction of chromaticity variations.

The third chromaticity rank area f1 is in the shape of a quadrangle having the X-direction chromaticity coordinate difference ΔX3 (about 0.008 in the illustrated example) as one side and the Y-direction chromaticity coordinate difference ΔY3 (about 0.005 in the illustrated example) as another side, and specifically in the shape of a parallelogram approximately in parallel with the direction of chromaticity variations.

The fifth chromaticity rank area d1 is the same in chromaticity area size as the third chromaticity rank area f1.

The third and fifth chromaticity rank areas f1 and d1 are actually in the shape of a trapezoid formed by cutting away part of the parallelogram in FIGS. 13 and 14. The reason is that the size of the third and fifth chromaticity rank areas f1 and d1 is reduced for further narrowing the chromaticity rank area after the color mixture (further reducing the range of chromaticity variations), i.e., for setting a target setting area allowing for a margin. This makes it possible to reduce the number of optical sheets for reduction in chromaticity unevenness when the white LEDs are placed on the light emitting modules 50, and thus lead to achievement of cost reduction.

As shown in FIG. 13, the third chromaticity rank area f1 and the fourth chromaticity rank area e1 are respectively included in the first chromaticity rank area g and the second chromaticity rank area E. Therefore, when arbitrary white LEDs 17 and 17 respectively belonging to the third chromaticity rank area f1 and the fourth chromaticity rank area e1 are placed adjacent to each other, the resultant chromaticity after the color mixture falls within the target chromaticity rank area M.

Likewise, the fifth chromaticity rank area d1 and the sixth chromaticity rank area e3 are included in the first chromaticity rank area g and the second chromaticity rank area E. Therefore, when arbitrary white LEDs 17 and 17 respectively belonging to the fifth chromaticity rank area d1 and the sixth chromaticity rank area e3 are placed adjacent to each other, the resultant chromaticity after the color mixture falls within the target chromaticity rank area M. As for a seventh chromaticity rank area e2 and an eighth chromaticity rank area e4, also, when arbitrary white LEDs 17 and 17 respectively belonging to the chromaticity rank areas e2 and e4 are placed adjacent to each other, the resultant chromaticity after the color mixture falls within the target chromaticity rank area M.

The white LEDs falling within the target chromaticity rank area M use the two chromaticity rank area classifying methods described above and thus are provided with two chromaticity rank data units.

In the chromaticity rank area classifying methods, it is preferable to set chromaticity rank areas smaller in size than the target chromaticity rank area M.

The reason is that it is desired to reduce the range of chromaticity variations by minimizing the range obtained by color mixture.

It is preferable to use a white LED 17 in a chromaticity rank area overlapping the target chromaticity rank area M as one of the adjacent white LEDs 17 and 17.

The upper-limit values of the range of variations in chromaticity unevenness for the target chromaticity rank area M within which the variations are unobtrusive, obtained from the evaluation results for illumination devices and liquid crystal displays, can be about 0.01 (more preferably, about 0.007) for ΔX and about 0.025 (more preferably, about 0.01) for ΔY, for example. If the chromaticity differences ΔX and ΔY are larger than these upper-limit values, the chromaticity unevenness will become obtrusive. Therefore, it is preferable to place the adjacent white LEDs 17 and 17 so that the range of chromaticity variations after the color mixture can be within the above upper-limit values.

The white LEDs 17 can be arranged using either one of Arrangement Methods 1 and 2 below depending on the stock quantity of the white LEDs 17 determined by the distribution thereof. The arrangement methods of the white LEDs 17 on the LED substrates 20 will be described hereinafter.

<Arrangement Methods of White LEDs on LED Substrates>

Figure 15:
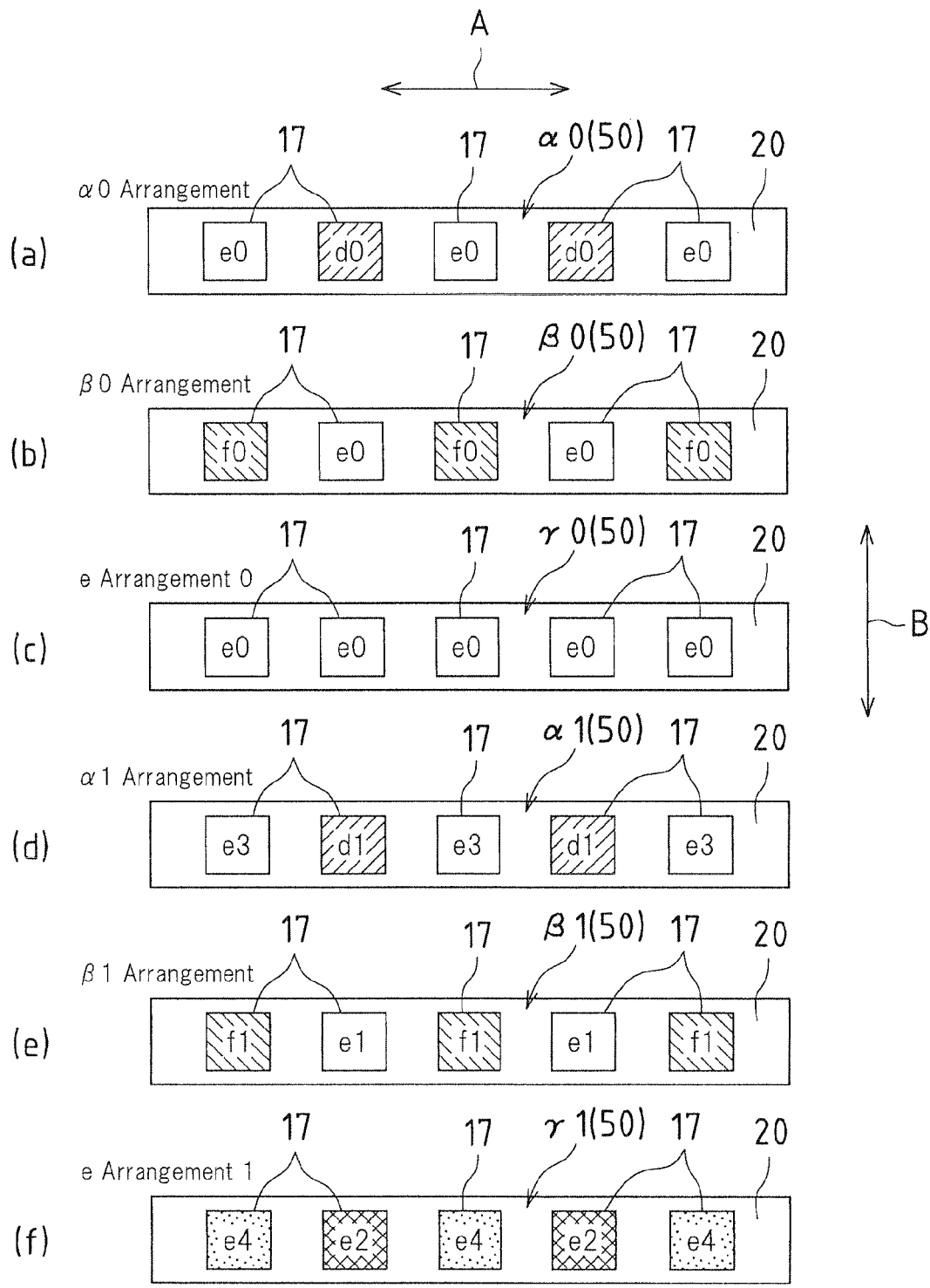
FIG. 15 shows views for describing arrangement methods of white LEDs on an LED substrate, in which (a) to (c) are views showing arrangements of white LEDs on the LED substrate in first to third type light emitting modules, and (d) to (f) are views showing arrangements of white LEDs on the LED substrate in fourth to sixth type light emitting modules.

FIG. 15 shows views for describing arrangement methods of white LEDs 17 on the LED substrate 20, where FIGS. 15(a) to 15(c) show arrangements of white LEDs 17 on the LED substrate 20 of first to third type light emitting modules α0, β0, and γ0 (50), and FIGS. 15(d) to 15(f) show arrangements of white LEDs 17 on the LED substrate 20 of fourth to sixth type light emitting modules α1, β1, and γ1 (50).

Note that the arrangement of the adjacent white LEDs 17 and 17 in the row direction A in each of the light emitting modules α0, β0, α1, β1, and γ1 may be reversed in FIG. 15.

[Arrangement Method 1]

Arrangement Method 1 is an arrangement method adopted when using the white LEDs 17 falling within the normal range of chromaticity variations as shown in FIGS. 11 and 12.

In this case, white LEDs belonging to adjacent chromaticity ranks can be selected as the adjacent white LEDs 17 and 17.

In Arrangement Method 1, the first to third type light emitting modules α0, β0, and e0 can be used as the light emitting module 50 as shown in FIGS. 15(a) to 15(c).

In the first type light emitting module α0, the white LEDs 17 belonging to the third chromaticity rank area e0 and the white LEDs 17 belonging to the sixth chromaticity rank area d0 are placed alternately on the LED substrate 20.

In the second type light emitting module β0, the white LEDs 17 belonging to the fourth chromaticity rank area f0 and the white LEDs 17 belonging to the third chromaticity rank area e0 are placed alternately on the LED substrate 20.

In the third type light emitting module γ0, the white LEDs 17 belonging to the third chromaticity rank area e0 and the white LEDs 17 belonging to the fifth chromaticity rank area e0, i.e., only the white LEDs 17 belonging to the third chromaticity rank area e0 are placed on the LED substrate 20.

Figure 16:
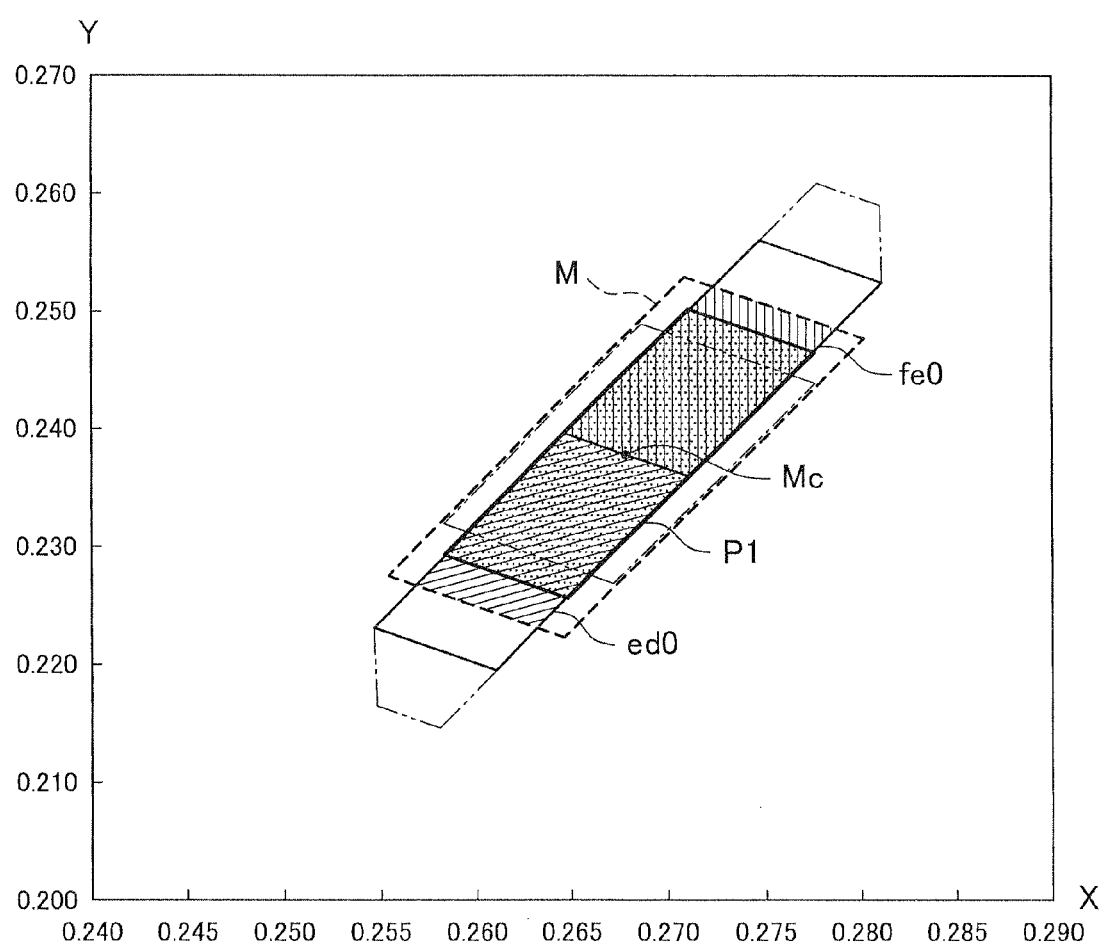
FIG. 16 is a graph of the CIE 1931 coordinates showing a chromaticity rank area after the color mixing between adjacent white LEDs in the first and second type light emitting modules.

FIG. 16 is a graph of the CIE 1931 coordinates showing chromaticity rank areas after the color mixture between the adjacent white LEDs 17 and 17 in the first type light emitting module α0 and the second type light emitting module β0.

In the first type light emitting module α0 and the second type light emitting module β0, the chromaticity rank areas after the color mixture of the adjacent white LEDs 17 and 17 are upper and lower hatched regions fe0 and ed0 as shown in FIG. 16.

In the third type light emitting module γ0, the chromaticity rank area after the color mixture of the adjacent white LEDs 17 and 17 is the third chromaticity rank area e0 shown in FIGS. 11 and 12 itself.

[Arrangement Method 2]

Arrangement Method 2 is an arrangement method adopted when using white LEDs 17 in a distribution of chromaticity variations the center of which is deviated as shown in FIGS. 13 and 14.

In this case, in the arrangement of the white LEDs 17 on the LED substrate 20, the white LEDs 17 belonging to the third chromaticity rank area f1 and the white LEDs 17 belonging to the fifth chromaticity rank area d1, both of which rank areas fall outside the normal range of variations, can be arranged in combination with the fourth chromaticity rank area e1 and the sixth chromaticity rank area e3, respectively, which fall within the target chromaticity rank area M.

In Arrangement Method 2, the fourth to sixth type light emitting modules α1, β1, and γ1 can be used as the light emitting module 50 as shown in FIGS. 15(d) to 15(f).

In the fourth type light emitting module α1, the white LEDs 17 belonging to the fifth chromaticity rank area d1 and the white LEDs 17 belonging to the sixth chromaticity rank area e3 are placed alternately on the LED substrate 20.

In the fifth type light emitting module β1, the white LEDs 17 belonging to the third chromaticity rank area f1 and the white LEDs 17 belonging to the fourth chromaticity rank area e1 are placed alternately on the LED substrate 20.

In the sixth type light emitting module γ1, the white LEDs 17 belonging to the seventh chromaticity rank area e2 and the white LEDs 17 belonging to the eighth chromaticity rank area e4 are placed alternately on the LED substrate 20.

Figure 17:
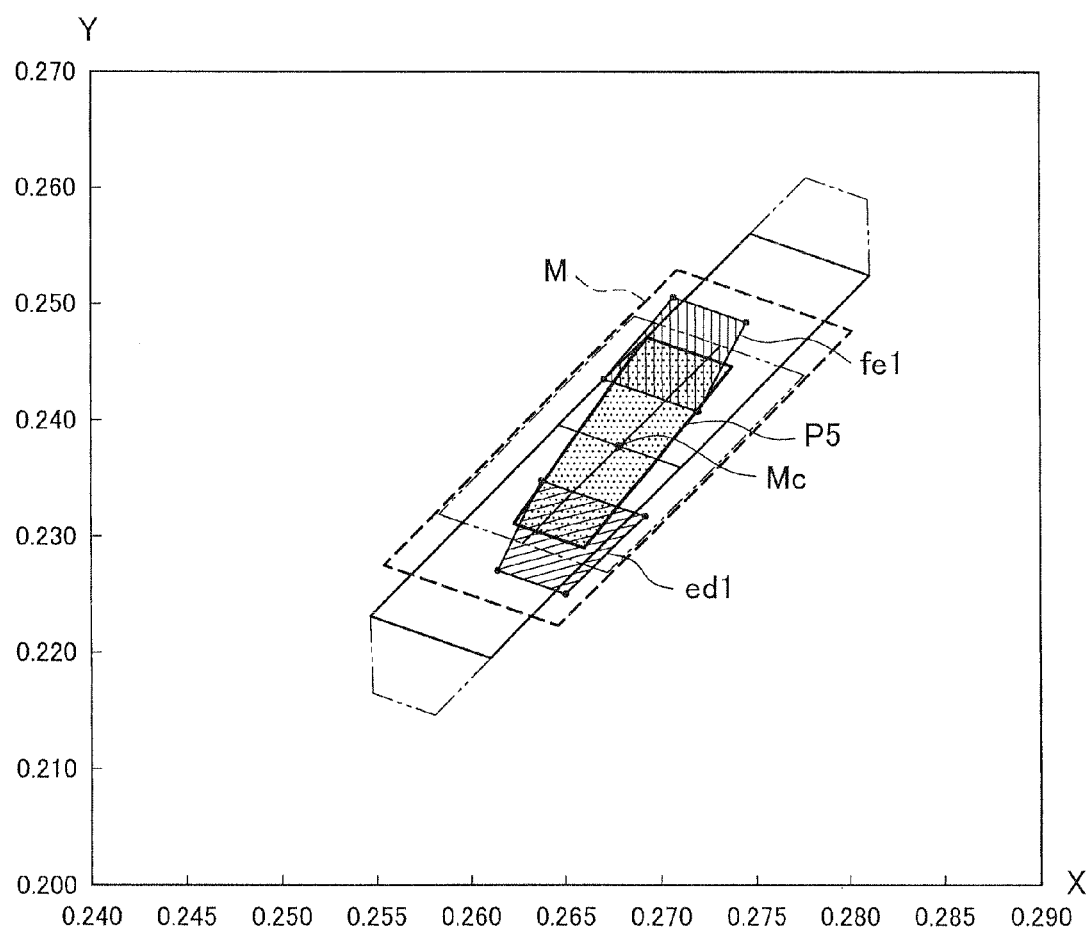
FIG. 17 is a graph of the CIE 1931 coordinates showing a chromaticity rank area after the color mixing between adjacent white LEDs in the fourth and fifth type light emitting modules.

FIG. 17 is a graph of the CIE 1931 coordinates showing chromaticity rank areas after the color mixture of the adjacent white LEDs 17 and 17 in the fourth type light emitting module α1 and the fifth type light emitting module β1.

In the fourth type light emitting module α1 and the fifth type light emitting module β1, the chromaticity rank areas after the color mixture between the adjacent white LEDs 17 and 17 are upper and lower hatched regions fe1 and ed1 as shown in FIG. 17.

In the sixth type light emitting module γ1, although not shown, the chromaticity rank area after the color mixture of the adjacent white LEDs 17 and 17 is a region of the fourth chromaticity rank area e1 shown in FIGS. 13 and 14 shifted (translated) so that the center of the area corresponds with the center Mc of the target chromaticity rank area M.

In Arrangement Method 2, since the chromaticity rank areas f1, d1, and e1 to e4 of the white LEDs 17 are smaller in size than the chromaticity rank areas f0, d0, and e0 in Arrangement Method 1. Therefore, the chromaticity rank areas fe1 and ed1 after the color mixture between the adjacent white LEDs 17 and 17 (see FIG. 17) can be made smaller in size than the chromaticity rank areas fe0 and ed0 after the color mixture in Arrangement Method 1 (see FIG. 16), whereby the in-plane chromaticity variation range of the light emitting module 50 itself can be made small compared with that in Arrangement Method 1.

Also, white LEDs in the fourth and sixth chromaticity rank areas f0 and d0 may be placed adjacent to each other, or white LEDs in the third and fifth chromaticity rank areas f1 and d1 may be adjacent to each other, and yet the resultant mixed color can be made to fall within the target chromaticity rank area M. However, the stock quantity is normally small for the fourth and sixth chromaticity rank areas f0 and d0 and the third and fifth chromaticity rank areas f1 and d1 because these chromaticity rank areas are outside the target chromaticity rank area M. Therefore, examples of such combinations are not shown in this embodiment, although white LEDs in such combinations may be placed adjacent to each other depending on the stock quantity.

Next, the rules of arrangement of the light emitting modules 50 on the chassis 14 will be described with reference to FIGS. 18 to 27.

<Arrangement Rule of Light Emitting Modules on Chassis>

This arrangement rule is an arrangement rule adopted when the first to sixth type light emitting modules α0, β0, γ0, α1, β1, and γ1 (50) described above on the chassis 14.

In arranging the first to sixth type light emitting modules α0, β0, γ0, α1, β1, and γ1 on the chassis 14 so that the length of the modules is along the arrangement direction (row direction) A, the light emitting modules 50 adjacent in the column direction B orthogonal to the row direction A of the white LEDs 17 (e.g., the first- and second-row light emitting modules 50) can be arranged according to the following rules [1a] and [1b].

[1a] One light emitting module out of the first type light emitting module α0 and the fourth type light emitting module α1 and one light emitting module out of the second type light emitting module β0 and the fifth type light emitting module β1 are combined. In other words, the combination of the first type light emitting module α0 and the fourth type light emitting module α1 and the combination of the second type light emitting module β0 and the fifth type light emitting module β1 are prohibited.

[1b] One light emitting module out of the first type light emitting module α0, the second type light emitting module β0, the fourth type light emitting module α1, and the fifth type light emitting module β1 and one light emitting module out of the third type light emitting module γ0 and the sixth type light emitting module γ1 are combined.

Examples of the combinations of the adjacent light emitting modules 50 and 50 in the column direction B are shown in FIGS. 18 to 21 as first to sixteenth patterns.

Figure 18:
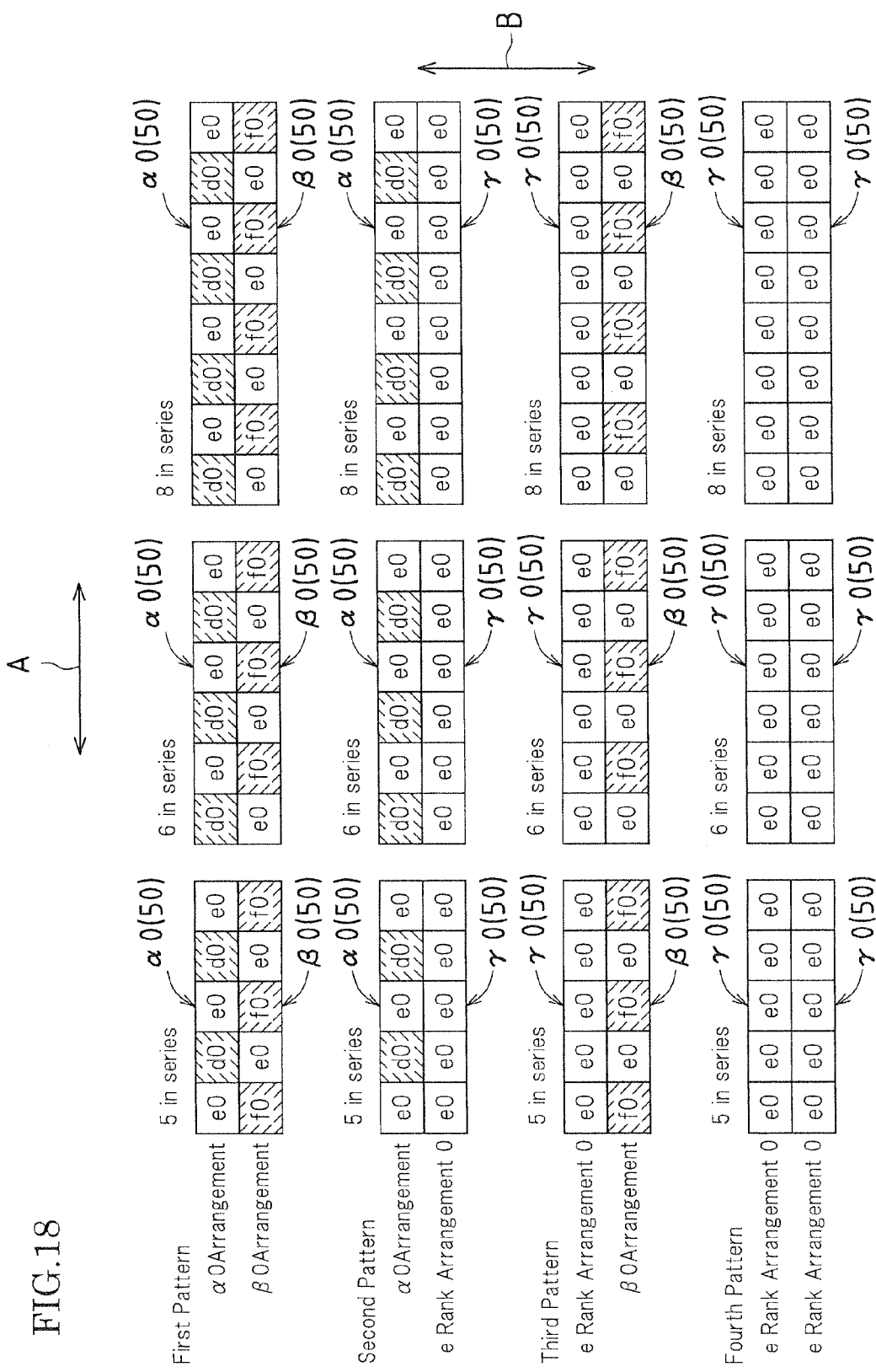
FIG. 18 shows pattern diagrams illustrating first to fourth patterns as examples of combinations of light emitting modules adjacent in the column direction.

Referring to FIG. 18, in the first pattern, the first type light emitting module α0 and the second type light emitting module β0 are arranged in the column direction B. In the second pattern, the first type light emitting module α0 and the third type light emitting module γ0 are arranged in the column direction B. In the third pattern, the third type light emitting module γ0 and the second type light emitting module β0 are arranged in the column direction B. In the fourth pattern, the third type light emitting module γ0 and the third type light emitting module γ0 are arranged in the column direction B.

Figure 19:
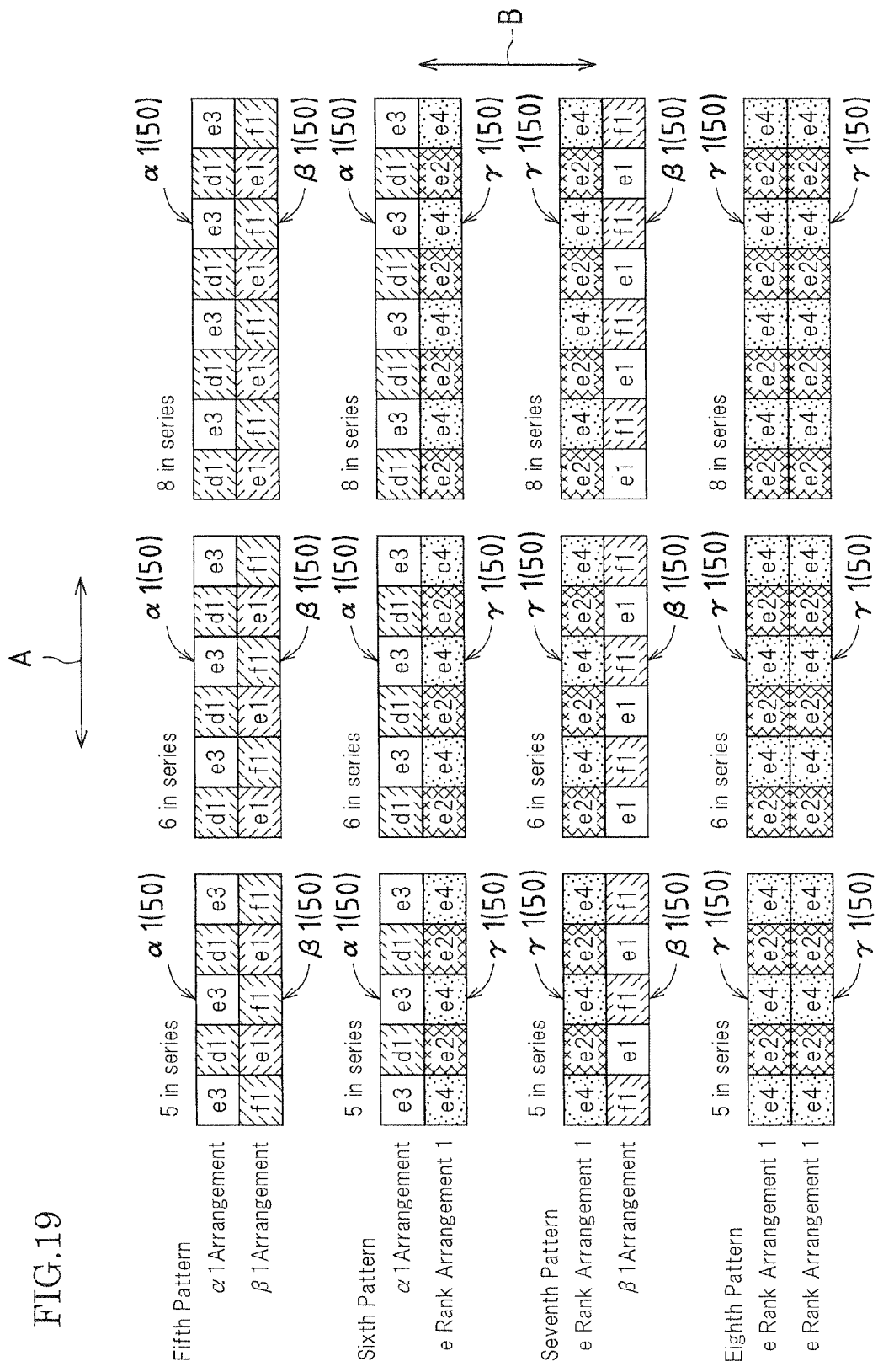
FIG. 19 shows pattern diagrams illustrating fifth to eighth patterns as examples of combinations of light emitting modules adjacent in the column direction.

Referring to FIG. 19, in the fifth pattern, the fourth type light emitting module α1 and the fifth type light emitting module β1 are arranged in the column direction B. In the sixth pattern, the fourth type light emitting module α1 and the sixth type light emitting module γ1 are arranged in the column direction B. In the seventh pattern, the sixth type light emitting module γ1 and the fifth type light emitting module β1 are arranged in the column direction B. In the eighth pattern, the sixth type light emitting module γ1 and the sixth type light emitting module γ1 are arranged in the column direction B.

Figure 20:
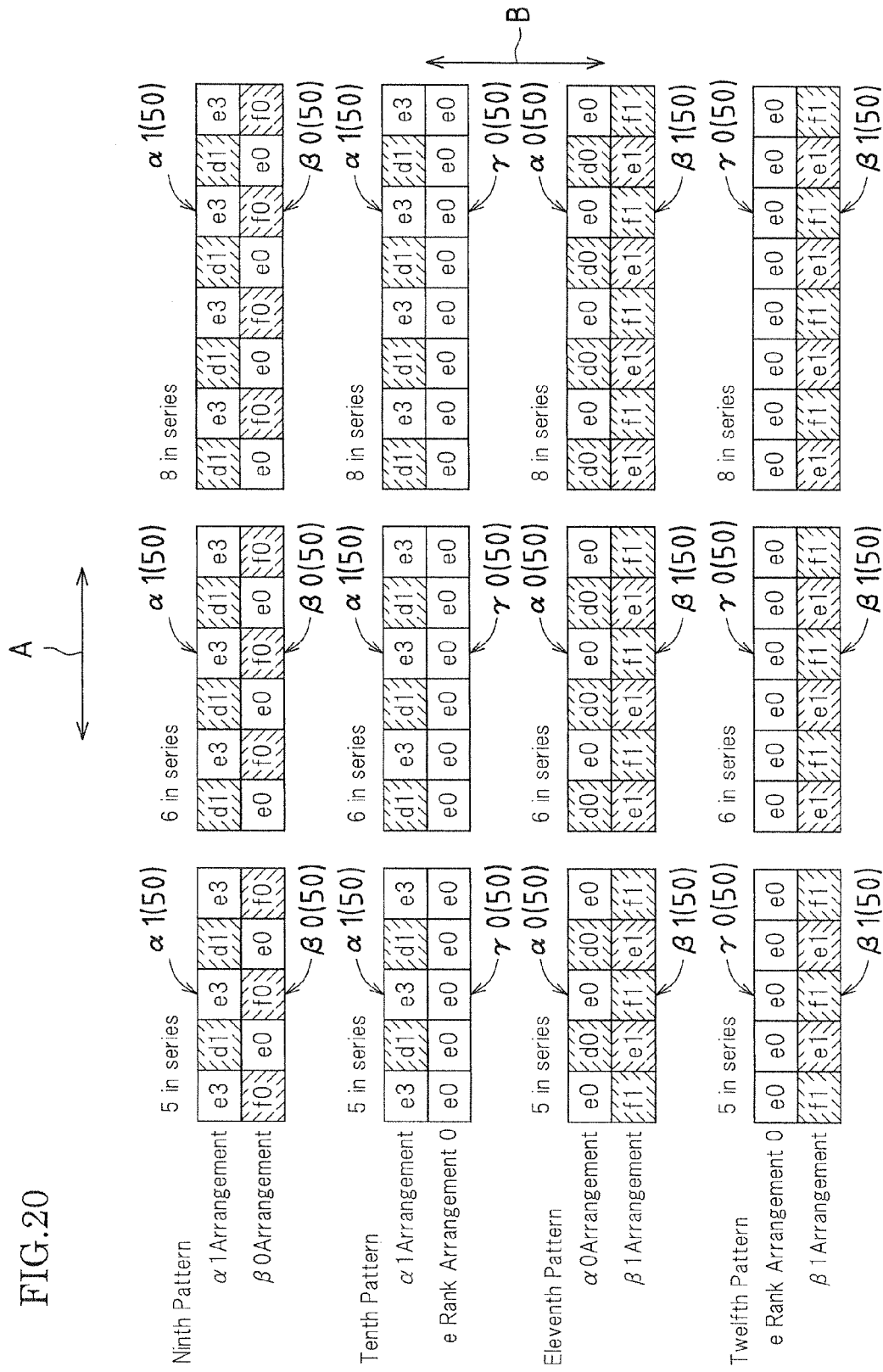
FIG. 20 shows pattern diagrams illustrating ninth to twelfth patterns as examples of combinations of light emitting modules adjacent in the column direction.

Referring to FIG. 20, in the ninth pattern, the fourth type light emitting module α1 and the second type light emitting module β0 are arranged in the column direction B. In the tenth pattern, the fourth type light emitting module α1 and the third type light emitting module β0 are arranged in the column direction B. In the eleventh pattern, the first type light emitting module α0 and the fifth type light emitting module β1 are arranged in the column direction B. In the twelfth pattern, the third type light emitting module γ0 and the fifth type light emitting module β1 are arranged in the column direction B.

Figure 21:
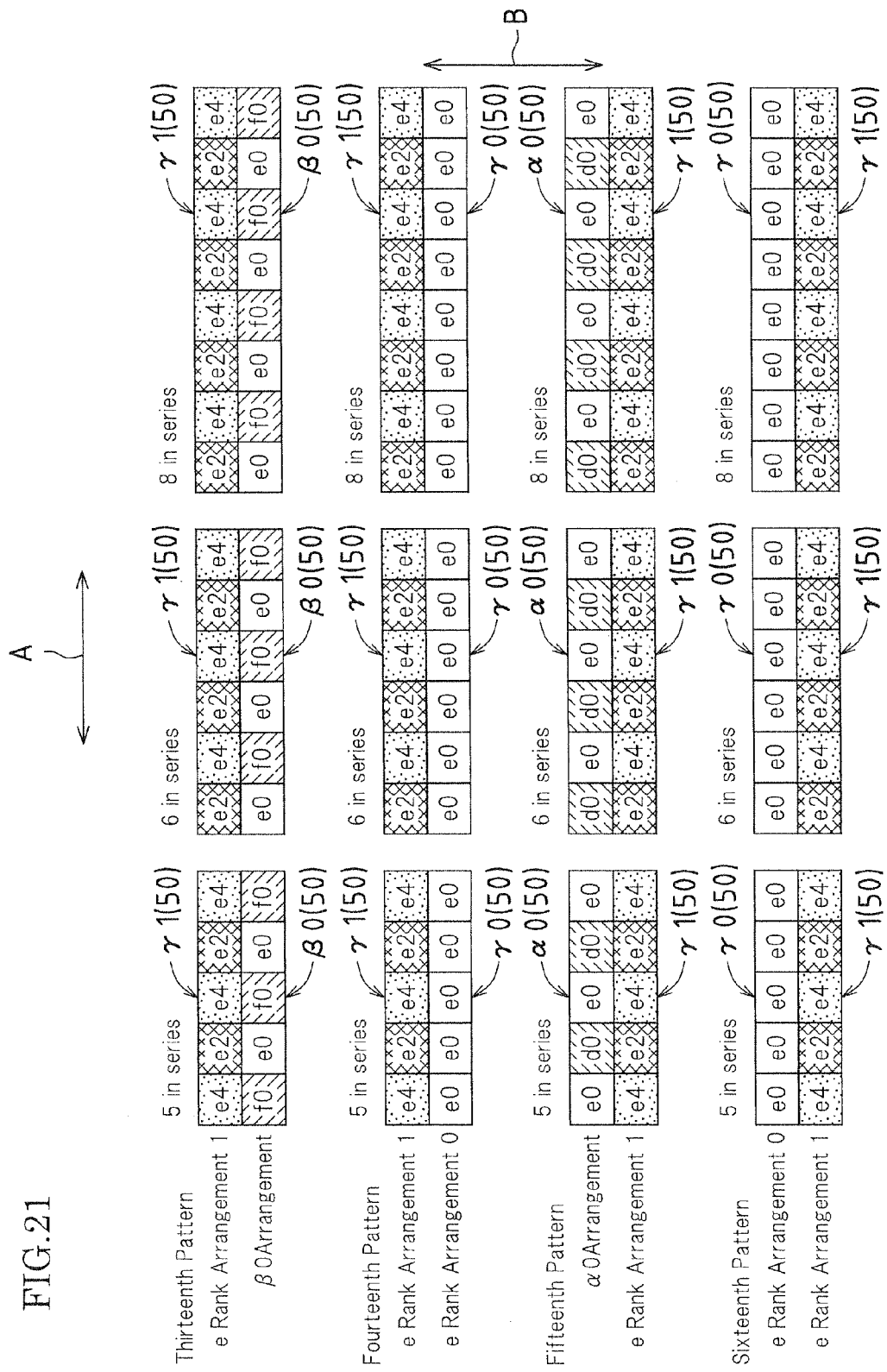
FIG. 21 shows pattern diagrams illustrating thirteenth to sixteenth patterns as examples of combinations of light emitting modules adjacent in the column direction.

Referring to FIG. 21, in the thirteenth pattern, the sixth type light emitting module γ1 and the second type light emitting module β0 are arranged in the column direction B. In the fourteenth pattern, the sixth type light emitting module γ1 and the third type light emitting module γ0 are arranged in the column direction B. In the fifteenth pattern, the first type light emitting module α0 and the sixth type light emitting module γ1 are arranged in the column direction B. In the sixteenth pattern, the third type light emitting module γ0 and the sixth type light emitting module γ1 are arranged in the column direction B.

Although examples of arrangements of five, six, and eight white LEDs 17 in the row direction A are shown in FIGS. 18 to 21, it goes without mentioning that the present invention is not limited to these examples.

The ranges of chromaticity variations after the color mixture between the light emitting modules 50 and 50 are shown in FIGS. 22 to 27 for the sixth pattern, the ninth pattern, the eleventh pattern, the thirteenth pattern, the fifteenth pattern, and the sixteenth pattern as typical examples among the examples shown in FIGS. 18 to 21. Note that the chromaticity variations are obtained from calculated values.

Figure 22:
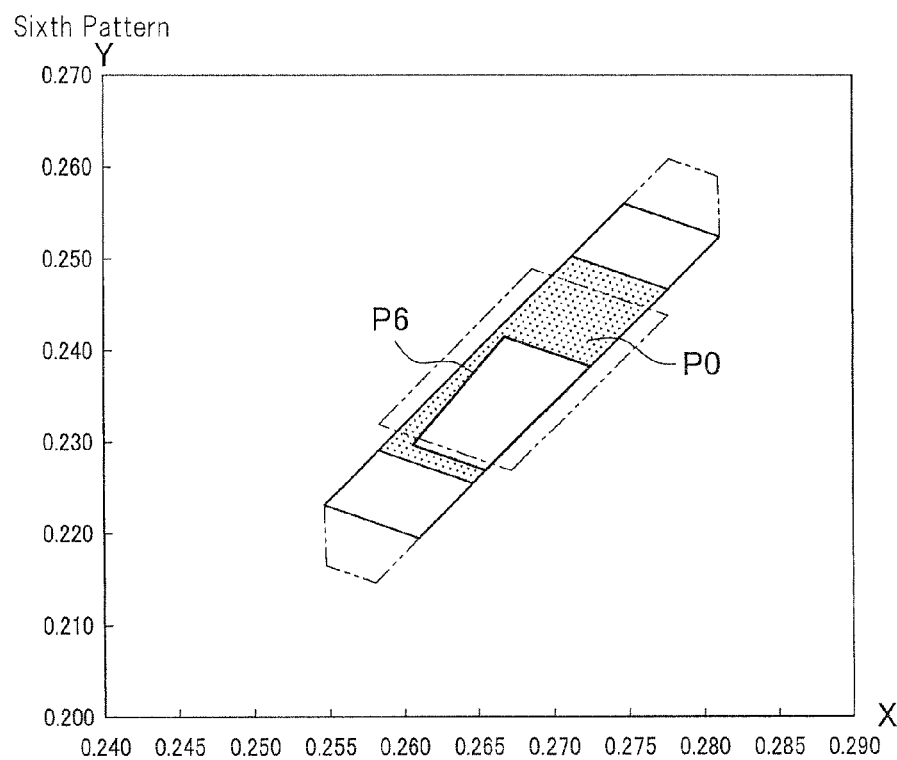
FIG. 22 is a graph of the CIE 1931 coordinates showing a range of chromaticity variations after the color mixing between light emitting modules for the sixth pattern as a typical example.
Figure 23:
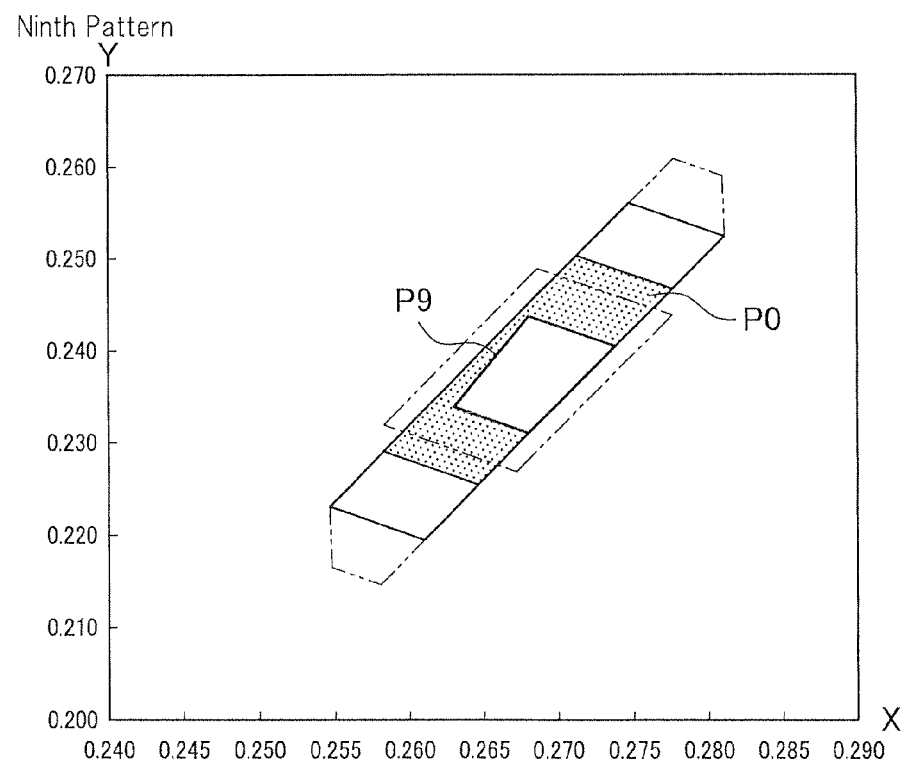
FIG. 23 is a graph of the CIE 1931 coordinates showing a range of chromaticity variations after the color mixing between light emitting modules for the ninth pattern as a typical example.

In the sixth pattern shown in FIG. 22, a bold-line frame P6 represents the range of chromaticity variations after the color mixture between the fourth type light emitting module α1 and the sixth type light emitting module γ1. In the ninth pattern shown in FIG. 23, a bold-line frame P9 represents the range of chromaticity variations after the color mixture between the fourth type light emitting module α1 and the second type light emitting module β0.

Figure 24:
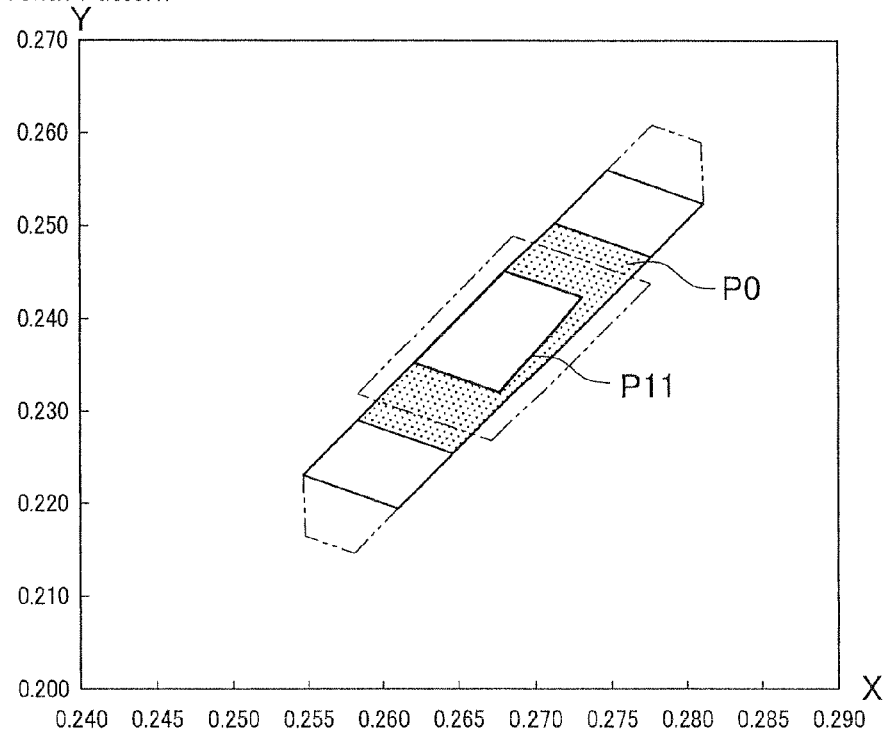
FIG. 24 is a graph of the CIE 1931 coordinates showing a range of chromaticity variations after the color mixing between light emitting modules for the eleventh pattern as a typical example.
Figure 25:
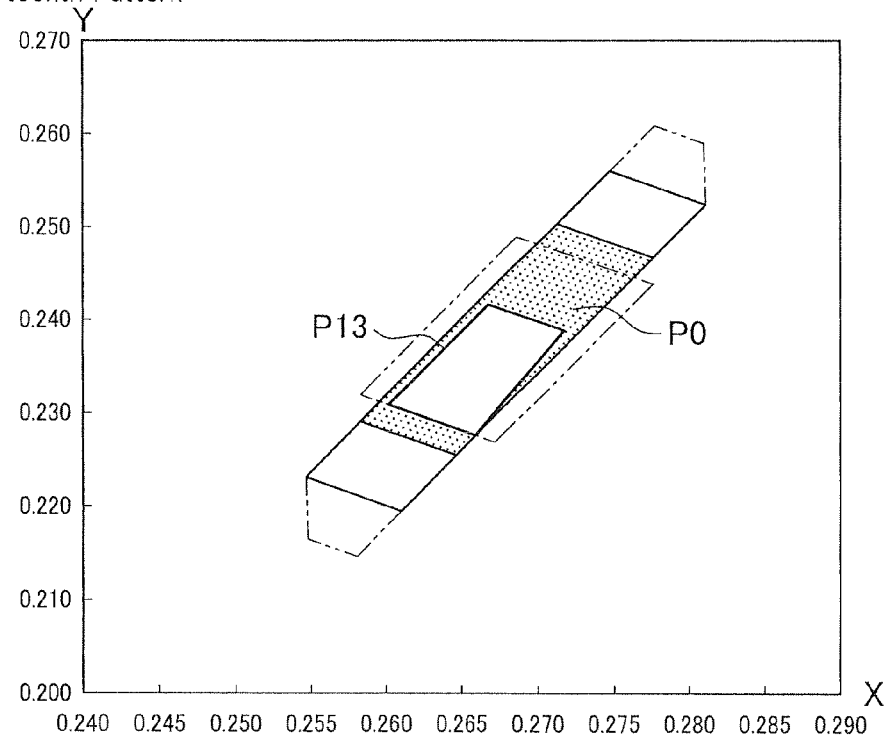
FIG. 25 is a graph of the CIE 1931 coordinates showing a range of chromaticity variations after the color mixing between light emitting modules for the thirteenth pattern as a typical example.

In the eleventh pattern shown in FIG. 24, a bold-line frame P11 represents the range of chromaticity variations after the color mixture between the first type light emitting module α0 and the fifth type light emitting module β1. In the thirteenth pattern shown in FIG. 25, a bold-line frame P13 represents the range of chromaticity variations after the color mixture between the sixth type light emitting module γ1 and the second type light emitting module β0.

Figure 26:
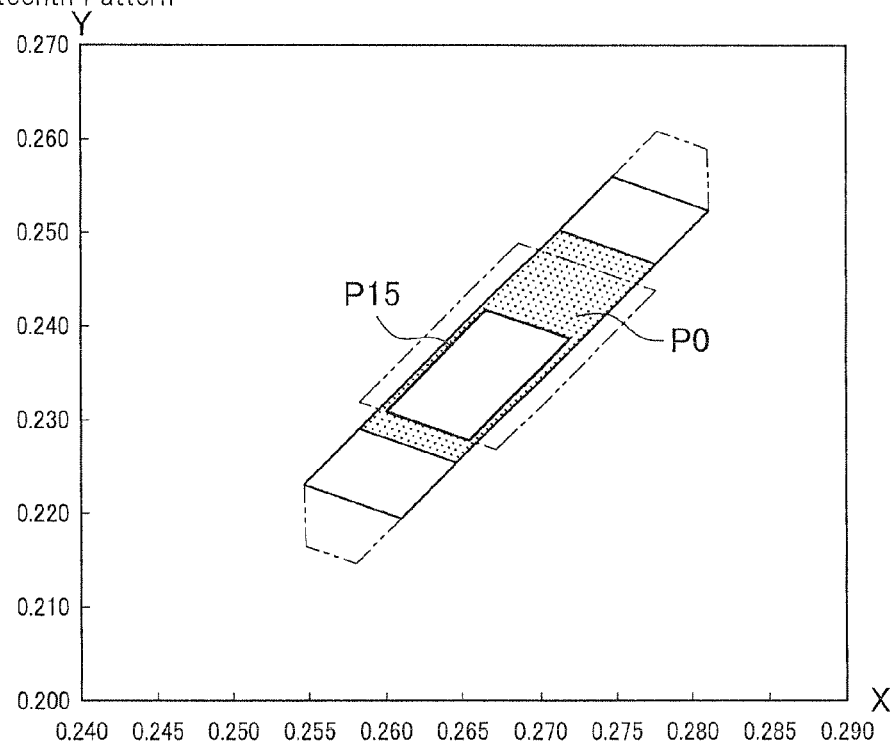
FIG. 26 is a graph of the CIE 1931 coordinates showing a range of chromaticity variations after the color mixing between light emitting modules for the fifteenth pattern as a typical example.

In the fifteenth pattern shown in FIG. 26, a bold-line frame P15 represents the range of chromaticity variations after the color mixture between the first type light emitting module α0 and the sixth type light emitting module γ1. In the sixteenth pattern shown in FIG. 27, a bold-line frame P16 represents the range of chromaticity variations after the color mixture between the third type light emitting module γ0 and the sixth type light emitting module γ1.

Note that the range of chromaticity variations after the color mixture between the first type light emitting module α0 and the second type light emitting module β0 in the first pattern is represented by a bold-line frame P1 in FIG. 16, and the range of chromaticity variations after the color mixture between the fourth type light emitting module α1 and the fifth type light emitting module β1 in the fifth pattern is represented by a bold-line frame P5 in FIG. 17.

Figure 27:
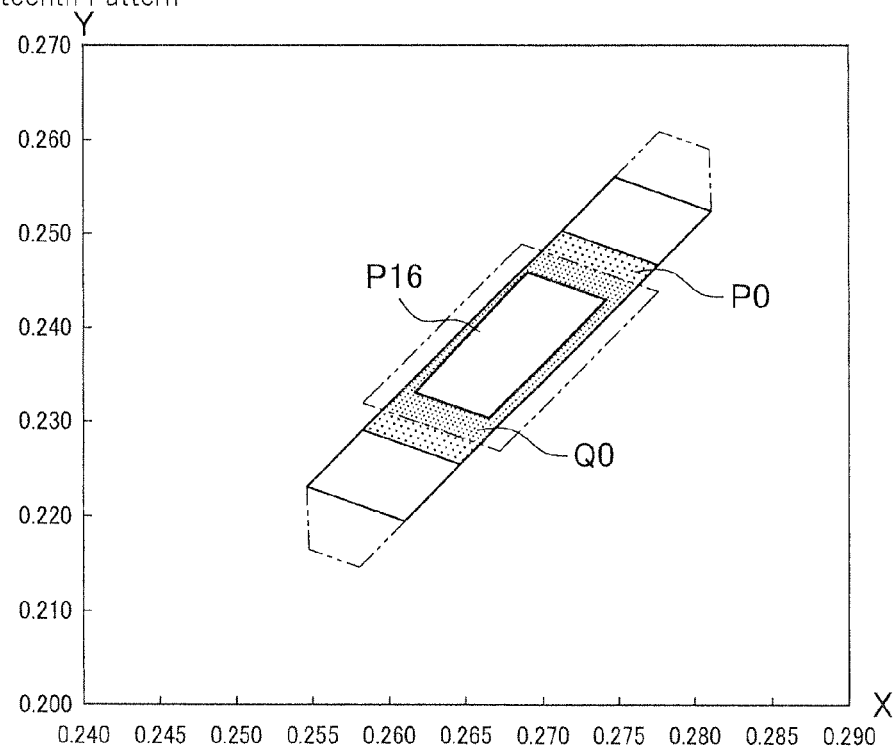
FIG. 27 is a graph of the CIE 1931 coordinates showing a range of chromaticity variations after the color mixing between light emitting modules for the sixteenth pattern as a typical example.

In FIGS. 22 to 27, a dot-patterned area P0 represents the range of chromaticity variations of the light emitting modules 50 and 50 observed when only the first type light emitting module α0 or only the second type light emitting module β0 is used. In FIG. 27, a thick dot-patterned area Q0 represents the range of chromaticity variations of the light emitting modules 50 and 50 observed when only the third type light emitting module γ0 is used.

The chromaticity rank areas fe1 and ed1 (see FIG. 17) after the color mixture between the adjacent white LEDs 17 and 17 in the fourth and fifth type light emitting modules α1 and β1, the chromaticity rank area (illustration omitted) after the color mixture between the adjacent white LEDs 17 and 17 in the sixth type light emitting module γ1, and the chromaticity rank areas (e.g., the chromaticity rank area P5 shown in FIG. 17 and the chromaticity rank areas P6, P9, P11, P13, P15, and P16 shown in FIGS. 22 to 27) after the color mixture between the light emitting modules 50 and 50 as combinations selected from the first to sixth type light emitting modules α0 to γ1 arranged in the column direction B, as arranged according to the rules described above, are smaller in size than the dot-patterned area P0 shown in FIGS. 22 to 27. This indicates that the chromaticity variations can be reduced by arranging the adjacent white LEDs 17 and 17, and also the adjacent modules 50 and 50, according to the rules described above.

FIG. 6 shows an example of arrangement of the light emitting modules 50 on the chassis 14 based on the rules described above.

As for the arrangement of the light emitting modules 50 in the row direction A, it is preferable to arrange the modules according to, but not limited to, the following rules [2a] and [2b].

[2a] The white LEDs 17 and 17 adjacent (via a connector 22, for example) at the opposing ends of the light emitting modules 50 and 50 adjacent in the row direction A are arranged so that the mixed color of this combination of the white LEDs can fall within the target chromaticity rank area M from the standpoint of improving the color mixture unevenness at a position (e.g., the connector 22) between the light emitting modules 50 and 50 adjacent in the row direction A.

[2b] A white LED 17 having no partner white LED 17 for color mixture in light emitting modules 50 and 50 adjacent in the row direction A (e.g., a white LED 17 on a light emitting module 50 located at the periphery of the chassis 14 at the end thereof closer to the periphery of the chassis 14) should be a white LED 17 belonging to a chromaticity rank area falling within the target chromaticity rank area M, such as the third, fourth, and sixth chromaticity rank areas e0, e1, and e3, from the standpoint of improving the chromaticity unevenness at the white LED 17 having no partner white LED 17 for color mixture.

Note that, if a sufficient amount of light emitting modules 50 are kept in stock, it is preferable to determine the arrangement considering reducing the chromaticity variations.

Figure 28:
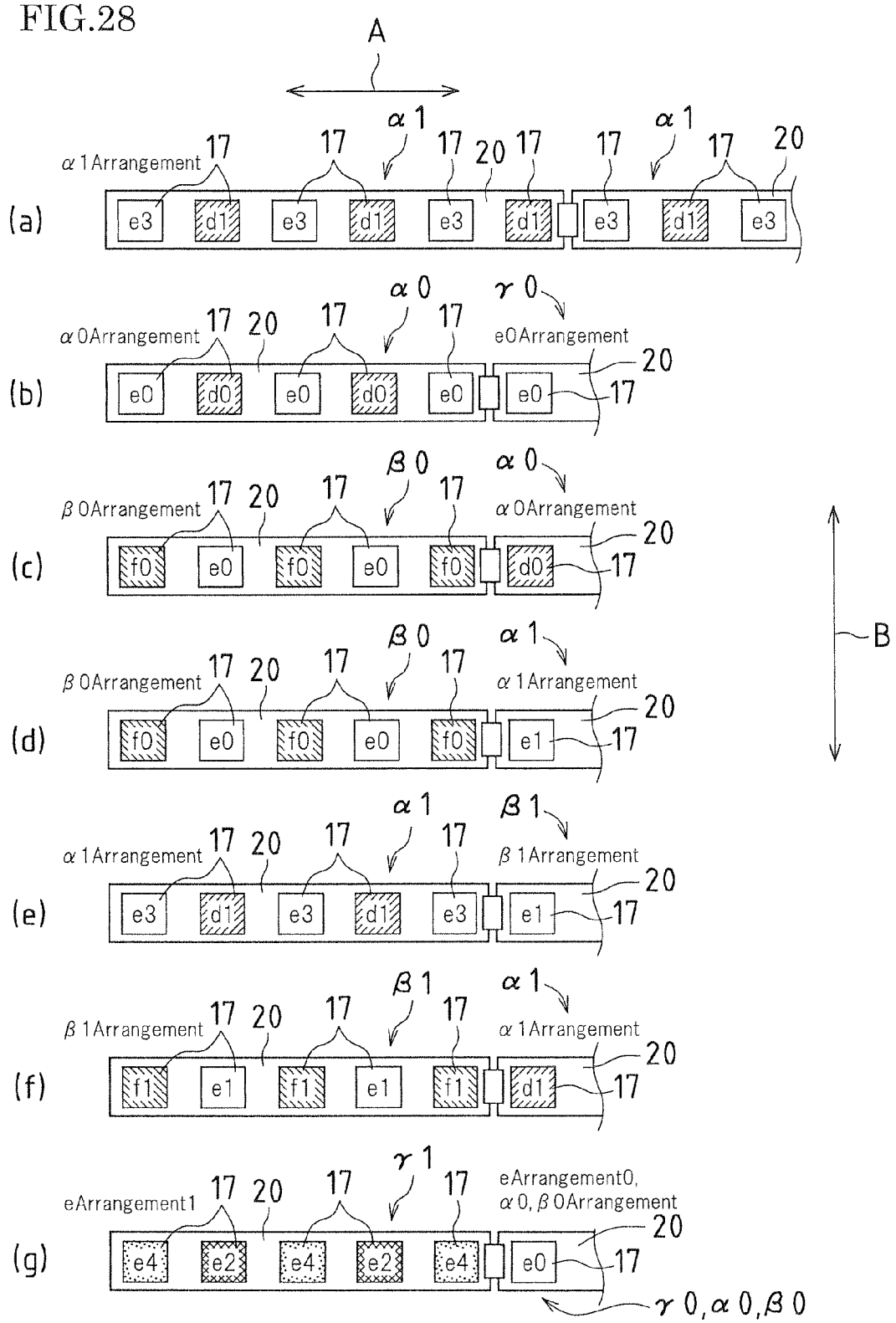
FIG. 28 show arrangements of light emitting modules adjacent via a connector, where (a) shows the case of placing an even number of white LEDs on the LED substrate, and (b) to (g) show the cases of placing an odd number of white LEDs on the LED substrate.

Arrangement examples as shown in FIG. 28 can be presented as specific examples of the arrangement rules for placing the light emitting modules 50 and 50 adjacent in the row direction A.

FIG. 28 shows arrangements of the light emitting modules 50 and 50 adjacent in the row direction A, where FIG. 28(a) shows the case of placing an even number of white LEDs 17 on the LED substrate 20, and FIGS. 28(b) to 28(g) show the cases of placing an odd number of white LEDs 17 on the LED substrate 20. Note that the placement of the white LEDs 17 and 17 adjacent in the row direction A in the light emitting modules α1, β1, and γ1 shown in FIGS. 28(e) to 28(g) may be reversed.

[1] Case of First, Second, Fourth, and Fifth Type Light Emitting Modules

[1-1] Case of Placing an Even Number of White LEDs on LED Substrate

In the case of placing an even number of white LEDs 17 on the LED substrate 20 as shown in FIG. 28(a) in the first, second, fourth, and fifth type light emitting modules α0, α0, α1, and β1, light emitting modules of the same type can be placed as the light emitting modules 50 and 50 adjacent in the row direction A, because the chromaticity variations are kept unchanged according to the arrangement rules described above for the white LEDs 17 and 17 adjacent at the opposing ends of the light emitting modules 50 and 50 adjacent in the row direction A.

[1-2] Case of Placing an Odd Number of White LEDs on LED Substrate

In the case of placing an odd number of white LEDs 17 on the LED substrate 20, when white LEDs 17 in a chromaticity rank area falling within the target chromaticity rank area M, such as the seventh chromaticity rank area e2 and the sixth chromaticity rank area e3, are placed at both ends of the LED substrate 20 in the row direction A, no limitation is especially posed. Light emitting modules of the same type may be arranged adjacent to each other in the row direction A. Otherwise, the third and sixth type light emitting modules γ0 and γ1 may be arranged adjacent to each other in the row direction A (see FIG. 28(g)).

When white LEDs 17 in a chromaticity rank area falling within the target chromaticity rank area M, such as the third chromaticity rank area e0, are placed at both ends of the LED substrate 20 in the row direction A, it is preferable to arrange light emitting modules 50 and 50 adjacent in the row direction A so that the first type light emitting module α0 and the second type light emitting module β0 are combined as shown in FIG. 28(c), or the fourth type light emitting module α1 and the fifth type light emitting module β1 are combined as shown in FIG. 28(f), for example.

[2] Case of Third and Sixth Type Light Emitting Modules

It is preferable not to place the third type light emitting module γ0 next to the fourth type light emitting module α1 having a white LED 17 belonging to the fifth chromaticity rank area d1 placed at its end in the row direction A or next to the fifth type light emitting module β1 having a white LED 17 belonging to the third chromaticity rank area f1 placed at its end in the row direction A. No limitation other than this is especially posed.

It is preferable to place the sixth type light emitting module γ1 next to a light emitting module 50 having a white LED 17 belonging to any of the third chromaticity rank area f1, the fourth chromaticity rank area f0, the third chromaticity rank area e0, and the sixth chromaticity rank area e3 placed at its end in the row direction A if only the sixth type light emitting module γ1 has a white LED 17 belonging to the fourth chromaticity rank area e1 that is shared with the seventh chromaticity rank area e2 placed at its end in the row direction A.

Also, it is preferable to place the sixth type light emitting module γ1 next to a light emitting module 50 having a white LED 17 belonging to any of the third chromaticity rank area e0, the fourth chromaticity rank area e1, the fifth chromaticity rank area d1, and the sixth chromaticity rank area d0 placed at its end in the row direction A if only the sixth type light emitting module γ1 has a white LED 17 belonging to the sixth chromaticity rank area e3 that is shared with the eighth chromaticity rank area e4 placed at its end in the row direction A.

Figure 29:
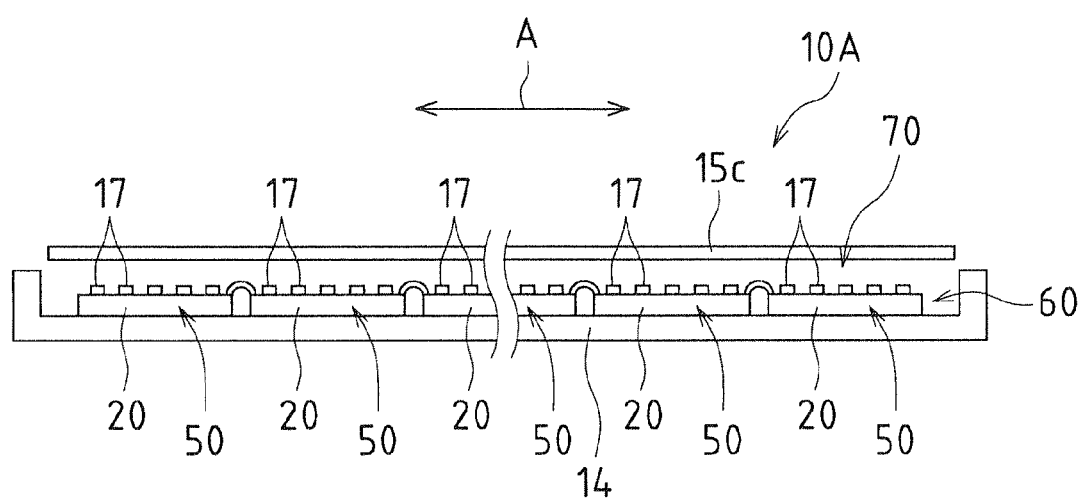
FIG. 29 is a cross-sectional view showing a schematic configuration of an illuminating device having a surface light source and a diffuser.

In the embodiment of the present invention described above, the light emitting modules 50 constituting the surface light source 70 were applied to the liquid crystal display 10. Alternatively, the light emitting modules 50 may be applied to an illuminating device 10A having the surface light source 70 and a diffuser 15c, as shown in FIG. 29.

Also, in the embodiment of the present invention, described was an example of the blue light emitting chips formed by placing the light emitting modules 50 on the chassis 14. Alternatively, the white LEDs 17 may be placed directly on the chassis 14, or on a mount substrate having the same size as the chassis 14. In this case, the arrangement of adjacent white LEDs, not only in the row direction A, but also in the column direction B, may be performed based on the <Arrangement Methods of White LEDs on LED Substrates> described above.

The setting of the chromaticity rank areas is not limited to the examples described herein, but the sizes, placements, and shapes of the chromaticity rank areas combined may be changed depending on the distribution of the chromaticity variations and the target chromaticity rank area M after the color mixture based on the <Basic Idea on Arrangement Method of White LEDs under Setting of Chromaticity Rank Areas>.

DESCRIPTION OF REFERENCE NUMERALS

10 Liquid crystal display
10A Illuminating device
11 Liquid crystal panel
12 Backlight device (an example of illuminating device)
14 Chassis (an example of housing)
15 Optical sheet group
15a, 15c Diffuser
15b Optical sheet
17 White LED (an example of dot light source)
20 LED substrate (an example of substrate)
21 Diffusion lens
22 Connector
50 Light emitting module
60 Illumination module
70 Surface light source
A Direction of arrangement of white LEDs (row direction)
B Direction orthogonal to the direction of arrangement of white LEDs (column direction)

E Second chromaticity rank area
E1 Fourth chromaticity rank area
Ec Center of second chromaticity rank area E
M Target chromaticity rank area
Mc Center of target chromaticity rank area M
TV Television receiver
d1 Fifth chromaticity rank area
d0 Sixth chromaticity rank area
e0 Third chromaticity rank area
e0 Fifth chromaticity rank area
e1 Fourth chromaticity rank area
e2 Seventh chromaticity rank area
e3 Sixth chromaticity rank area
e4 Eighth chromaticity rank area
f0 Fourth chromaticity rank area
f1 Third chromaticity rank area
g First chromaticity rank area
g1 Third chromaticity rank area
gE1 Virtual straight line
gE2 Virtual straight line
gc Center of first chromaticity rank area g
ΔX X-coordinate difference of target chromaticity rank area
ΔY Y-coordinate difference of target chromaticity rank area
ΔX1 X-coordinate difference of first chromaticity rank area
ΔY1 Y-coordinate difference of first chromaticity rank area
ΔX2 X-coordinate difference of second chromaticity rank area
ΔY2 Y-coordinate difference of second chromaticity rank area
α0 First type light emitting module
β0 Second type light emitting module
γ0 Third type light emitting module
α1 Fourth type light emitting module
β1 Fifth type light emitting module
γ1 Sixth type light emitting module

The invention claimed is:

1. A light emitting module comprising:
a substrate; and
a plurality of dot light sources placed on the substrate and configured to emit white light,
wherein each of the dot light sources is classified into a chromaticity rank on CIE 1931 coordinates according to its chromaticity,
one dot light source, out of adjacent dot light sources, belongs to a parallelogram-shaped first chromaticity rank area, and the other dot light source belongs to a parallelogram-shaped second chromaticity rank area,
one side, or another side not in parallel with the one side, of each of the first and second chromaticity rank areas is parallel to one side, or another side not in parallel with the one side, of a parallelogram-shaped target chromaticity rank area,
assuming that an x-coordinate difference that is a chromaticity coordinate difference of the one side of the target chromaticity rank area projected on the x-axis is ΔX, the one side being on the side allowed be directly projected on the x-axis, and a y-coordinate difference that is a chromaticity coordinate difference of the another side of the target chromaticity rank area projected on the y-axis is ΔY, the another side being the side that can be directly projected on the y-axis,
that an x-coordinate difference that is a chromaticity coordinate difference of the one side of the first chromaticity rank area projected on the x-axis is ΔX1, the one side being the side that can be directly projected on the x-axis, and a y-coordinate difference that is a chromaticity coordinate difference of the another side of the first chromaticity rank area projected on the y-axis is ΔY1, the another side being the side that can be directly projected on the y-axis, and
that an x-coordinate difference that is a chromaticity coordinate difference of the one side of the second chromaticity rank area projected on the x-axis is ΔX2, the one side being the side that can be directly projected on the x-axis, and a y-coordinate difference that is a chromaticity coordinate difference of the another side of the second chromaticity rank area projected on the y-axis is ΔY2, the another side being the side that can be directly projected on the y-axis,
the adjacent dot light sources satisfy relationships $$\Delta X1 + \Delta X2 = \Delta X \times 2$$

and $$\Delta Y1 + \Delta Y2 = \Delta Y \times 2$$

so that the resultant mixed color can fall within the target chromaticity rank area, and
the center of the first chromaticity rank area and the center of the second chromaticity rank area are axisymmetric with respect to a virtual straight line that passes through the center of the target chromaticity rank area and is parallel to the one side or the another side of the target chromaticity rank area.

2. The light emitting module of claim 1,
wherein the one dot light source belongs to a third chromaticity rank area that is included in the first chromaticity rank area and smaller in size than the first chromaticity rank area, and the other dot light source belongs to a fourth chromaticity rank area that is included in the second chromaticity rank area and smaller in size than the second chromaticity rank area.

3. The light emitting module of claim 2,
wherein the one and other dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas.

4. The light emitting module of claim 3,
wherein either one of the third and fourth chromaticity rank areas is at least placed within the target chromaticity rank area.

5. The light emitting module of claim 4,
wherein the third chromaticity rank area is apart from the fourth chromaticity rank area.

6. The light emitting module of claim 4,
wherein the third chromaticity rank area is opposed to the fifth chromaticity rank area with the target chromaticity rank area interposed therebetween.

7. The light emitting module of claim 6,
wherein the fourth chromaticity rank area is within the target chromaticity rank area and does not overlap the sixth chromaticity rank area.

8. The light emitting module of claim 6,
wherein the one and other dot light sources of the adjacent dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas.

9. The light emitting module of claim 4,
wherein the third chromaticity rank area is the same in area as the fifth chromaticity rank area.

10. The light emitting module of claim 9,
wherein the third and fourth chromaticity rank areas are quadrangular, and
the third chromaticity rank area is placed adjacent to the fourth chromaticity rank area with its side in contact with one side of the fourth chromaticity rank area.

11. The light emitting module of claim 10,
wherein the one and other dot light sources of the adjacent dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas.

12. A surface light source including a plurality of light emitting modules and a housing, the surface light source being formed by arranging the light emitting modules in a matrix on the housing,
wherein the light emitting modules each have a plurality of dot light sources arranged in line on a substrate,
wherein the light emitting modules include a third light emitting module that is the light emitting module of claim 9, and
wherein at least either one of light emitting modules adjacent in a direction orthogonal to the direction of arrangement of the dot light sources is the third light emitting module.

13. A liquid crystal display comprising the surface light source of claim 12, an optical sheet, and a liquid crystal panel.

14. An illuminating device comprising the surface light source of claim 12 and a diffuser.

15. The light emitting module of claim 2,
wherein the third and fourth chromaticity rank areas are in a shape of a parallelogram of which one side and another side not in parallel with the one side are respectively parallel to the one side and the another side not in parallel with the one side of the target chromaticity rank area.

16. The light emitting module of claim 2,
wherein the third chromaticity rank area is in a shape of a trapezoid formed by cutting away part of the parallelogram.

17. The light emitting module of claim 2,
wherein the third and fourth chromaticity rank areas are smaller in size than the target chromaticity rank area.

18. The light emitting module of claim 2,
wherein the target chromaticity rank area is set within a square chromaticity rank area having vertices at four chromaticity points (Xm+0.01, Ym+0.01), (Xm−0.01, Ym−0.01), (Xm+0.01, Ym−0.01), and (Xm−0.01, Ym+0.01) defined with respect to the chromaticity point (Xm, Ym) of the center.

19. The light emitting module of claim 1,
wherein the substrate is long shaped, and the plurality of spot light sources are placed linearly along the length of the substrate.

20. The light emitting module of claim 19,
wherein the plurality of spot light sources are placed on the substrate at equal intervals.

21. The light emitting module of claim 1,
wherein the plurality of spot light sources have the same configuration.

22. A surface light source comprising:
light emitting modules including a plurality of dot light sources mounted on a substrate; and
a housing;
wherein the plurality of dot light sources emit white light, and the substrate is long shaped,
wherein, in each of the light emitting modules, the plurality of dot light sources is placed linearly along the length of the substrate, and the light emitting modules are arranged in a matrix on the housing,
wherein each of the dot light sources is classified into a chromaticity rank on CIE 1931 coordinates according to its chromaticity,
wherein one dot light source, out of adjacent dot light sources, belongs to a parallelogram-shaped first chromaticity rank area, and the other dot light source belongs to a parallelogram-shaped second chromaticity rank area,
wherein one side, or another side not in parallel with the one side, of each of the first and second chromaticity rank areas is parallel to one side, or another side not in parallel with the one side, of a parallelogram-shaped target chromaticity rank area,
wherein, assuming that an x-coordinate difference that is a chromaticity coordinate difference of the one side of the target chromaticity rank area projected on the x-axis is $\Delta X$, the one side being on the side allowed be directly projected on the x-axis, and a y-coordinate difference that is a chromaticity coordinate difference of the another side of the target chromaticity rank area projected on the y-axis is $\Delta Y$, the another side being the side that can be directly projected on the y-axis,
that an x-coordinate difference that is a chromaticity coordinate difference of the one side of the first chromaticity rank area projected on the x-axis is $\Delta X1$, the one side being the side that can be directly projected on the x-axis, and a y-coordinate difference that is a chromaticity coordinate difference of the another side of the first chromaticity rank area projected on the y-axis is $\Delta Y1$, the another side being the side that can be directly projected on the y-axis, and
that an x-coordinate difference that is a chromaticity coordinate difference of the one side of the second chromaticity rank area projected on the x-axis is $\Delta X2$, the one side being the side that can be directly projected on the x-axis, and a y-coordinate difference that is a chromaticity coordinate difference of the another side of the second chromaticity rank area projected on the y-axis is $\Delta Y2$, the another side being the side that can be directly projected on the y-axis,
the adjacent dot light sources satisfy relationships $$\Delta X1 + \Delta X2 = \Delta X \times 2$$

and $$\Delta Y1 + \Delta Y2 = \Delta Y \times 2$$

so that the resultant mixed color can fall within the target chromaticity rank area,
wherein the center of the first chromaticity rank area and the center of the second chromaticity rank area are axisymmetric with respect to a virtual straight line that passes through the center of the target chromaticity rank area and is parallel to the one side or the another side of the target chromaticity rank area,
wherein the light emitting modules include:
a first configuration in which the one dot light source belongs to a third chromaticity rank area that is included in the first chromaticity rank area and smaller in size than the first chromaticity rank area, and the other dot light source belongs to a fourth chromaticity rank area that is included in the second chromaticity rank area and smaller in size than the second chromaticity rank area;

a second configuration in which, in the first configuration, the one and other dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas;

a third configuration in which, in the second configuration, either one of the third and fourth chromaticity rank areas is at least placed within the target chromaticity rank area;

a fourth configuration in which, in the third configuration, the third chromaticity rank area is opposed to the fifth chromaticity rank area with the target chromaticity rank area interposed therebetween; and a fifth configuration in which, in the fourth configuration, the one and other dot light sources of the adjacent dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas, wherein the surface light source includes a first light emitting module that is the light emitting module having the fourth configuration, and a second light emitting module that is the light emitting module having the fifth configuration, and wherein the first light emitting module and the second light emitting module are placed adjacent to each other on the housing in a direction orthogonal to the direction of arrangement of the dot light sources.

23. A liquid crystal display comprising the surface light source of claim 22, an optical sheet, and a liquid crystal panel.

24. An illuminating device comprising the surface light source of claim 22 and a diffuser.

25. A surface light source comprising;

light emitting modules including a plurality of dot light sources mounted on a substrate; and a housing, wherein the plurality of dot light sources emit while light, and the substrate is long shaped, wherein, in each of the light emitting modules, the plurality of dot light sources is placed linearly along the length of the substrate, and the light emitting modules are arranged in a matrix on the housing, wherein each of the dot light sources is classified into a chromaticity rank on CIE 1931 coordinates according to its chromaticity, wherein one dot light source, out of adjacent dot light sources, belongs to a parallelogram-shaped first chromaticity rank area, and the other dot light source belongs to a parallelogram-shaped second chromaticity rank area, wherein one side, or another side not in parallel with the one side, of each of the first and second chromaticity rank areas is parallel to one side, or another side not in parallel with the one side, of a parallelogram-shaped target chromaticity rank area, wherein, assuming that an x-coordinate difference that is a chromaticity coordinate difference of the one side of the target chromaticity rank area projected on the x-axis is $\Delta X$, the one side being on the side allowed be directly projected on the x-axis, and a y-coordinate difference that is a chromaticity coordinate difference of the another side of the target chromaticity rank area projected on the y-axis is $\Delta Y$, the another side being the side that can be directly projected on the y-axis, that an x-coordinate difference that is a chromaticity coordinate difference of the one side of the first chromaticity rank area projected on the x-axis is $\Delta X1$, the one side being the side that can be directly projected on the x-axis, and a y-coordinate difference that is a chromaticity coordinate difference of the another side of the first chromaticity rank area projected on the y-axis is $\Delta Y1$, the another side being the side that can be directly projected on the y-axis, and that an x-coordinate difference that is a chromaticity coordinate difference of the one side of the second chromaticity rank area projected on the x-axis is $\Delta X2$, the one side being the side that can be directly projected on the x-axis, and a y-coordinate difference that is a chromaticity coordinate difference of the another side of the second chromaticity rank area projected on the y-axis is $\Delta Y2$, the another side being the side that can be directly projected on the y-axis, the adjacent dot light sources satisfy relationships $$\Delta X1 + \Delta X2 = \Delta X \times 2$$

and $$\Delta Y1 + \Delta Y2 = \Delta Y \times 2$$

so that the resultant mixed color can fall within the target chromaticity rank area, wherein the center of the first chromaticity rank area and the center of the second chromaticity rank area are axisymmetric with respect to a virtual straight line that passes through the center of the target chromaticity rank area and is parallel to the one side or the another side of the target chromaticity rank area, wherein the light emitting modules include:

a first configuration in which the one dot light source belongs to a third chromaticity rank area that is included in the first chromaticity rank area and smaller in size than the first chromaticity rank area, and the other dot light source belongs to a fourth chromaticity rank area that is included in the second chromaticity rank area and smaller in size than the second chromaticity rank area;

a second configuration in which, in the first configuration, the one and other dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas;

a third configuration in which, in the second configuration, either one of the third and fourth chromaticity rank areas is at least placed within the target chromaticity rank area;

a sixth configuration in which, in the third configuration, the third chromaticity rank area is the same in area as the fifth chromaticity rank area; the third and fourth chromaticity rank areas are quadrangular; and the third chromaticity rank area is placed adjacent to the fourth chromaticity rank area with its side in contact with one side of the fourth chromaticity rank area; and a seventh configuration in which, in the sixth configuration, the one and other dot light sources of the adjacent dot light sources respectively belong to fifth and sixth chromaticity rank areas that are respectively at positions symmetric to the third and fourth chromaticity rank areas with respect to the center of the target chromaticity rank area and the same in shape as the third and fourth chromaticity rank areas, wherein the surface light source includes a first light emitting module that is the light emitting module having the sixth configuration, and a second light emitting module that is the light emitting module having the seventh configuration, and wherein the first light emitting module and the second light emitting module are placed adjacent to each other on the housing in a direction orthogonal to the direction of arrangement of the dot light sources.

\* \* \* \* \*